US012710324B2

(12) United States Patent
Fröhlich et al.

(10) Patent No.: US 12,710,324 B2
(45) Date of Patent: Aug. 18, 2026

(54) TORQUE-SENSOR DEVICE AND METHOD FOR ASSEMBLING A TORQUE-SENSOR DEVICE

(71) Applicant: VALEO SCHALTER UND SENSOREN GMBH, Bietigheim-Bissingen (DE)

(72) Inventors: Ekkehart Fröhlich, Bietigheim-Bissingen (DE); Roman Schoepe, Bietigheim-Bissingen (DE); Dennis Nieden, Bietigheim-Bissingen (DE); Dirk Rachui, Bietigheim-Bissingen (DE); Emil Balazs, Veszprem (CZ); Marcell Horvath, Veszprem (CZ)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 294 days.

(21) Appl. No.: 18/578,720

(22) PCT Filed: Jul. 11, 2022

(86) PCT No.: PCT/EP2022/069223
§ 371 (c)(1),
(2) Date: Jan. 12, 2024

(87) PCT Pub. No.: WO2023/285333
PCT Pub. Date: Jan. 19, 2023

(65) Prior Publication Data

US 2024/0337546 A1 Oct. 10, 2024

(30) Foreign Application Priority Data

Jul. 14, 2021 (DE) ......................... 102021118194.1

(51) Int. Cl.
*G01L 3/10* (2006.01)
*G01L 5/22* (2006.01)

(52) U.S. Cl.
CPC .............. *G01L 3/104* (2013.01); *G01L 5/221* (2013.01)

(58) Field of Classification Search
CPC ......... G01L 5/221; G01L 3/104; G01L 3/102; G01L 3/105; G01L 3/10; G01L 3/101;
(Continued)

(56) References Cited

U.S. PATENT DOCUMENTS 6,868,744 B2 * 3/2005 Sugimura ............... G01L 5/221 73/862.333
6,912,923 B2 * 7/2005 Froehlich ................ G01L 3/104 73/862.331

(Continued)

FOREIGN PATENT DOCUMENTS

DE 102004023801 A1 8/2005
DE 102005018286 A1 10/2006

(Continued)

OTHER PUBLICATIONS

International Search Report issued in corresponding German Patent Application No. DE 10 2021 118 194.1 issued Jun. 20, 2022 (5 pages).

(Continued)

*Primary Examiner* — Andre J Allen
(74) *Attorney, Agent, or Firm* — Osha Bergman Watanabe & Burton LLP

(57) ABSTRACT

A torque sensor device for detecting a torque applied to a steering shaft of a motor vehicle is disclosed. The torque sensor device includes a magnetic arrangement, a stator arrangement, a flux guide arrangement, and a magnetic sensor arrangement comprising at least one magnetic sensor.
(Continued)

The magnetic arrangement is configured to generate at least one magnetic field. The flux guide arrangement includes at least one first flux guide and a second flux guide. The first flux guide and the second flux guide each include at least one transmission surface. The at least one transmission surface of the first flux guide and the at least one transmission surface of the second flux guide lie opposite each other in such a way that they form an axial gap between them in which at least one magnetic sensor of the magnetic sensor arrangement is able to be arranged.

15 Claims, 7 Drawing Sheets

(58) Field of Classification Search
CPC ..... G01L 3/108; G01L 25/003; G01L 3/1457; G01L 3/103; G01L 3/04; G01L 3/00; G01L 3/109; G01L 3/1435; G01L 3/12; G01L 5/0042; G01L 5/226; G01L 5/0061; G01L 5/1627; G01L 3/14; G01L 5/22; G01L 3/02; G01L 3/08; G01L 1/2231; G01L 3/1428; G01L 3/106; G01L 5/16; G01L 5/0076; G01L 1/125; G01L 5/24; G01L 1/22; G01L 5/165; G01L 25/00; G01L 1/2206; G01L 1/14; G01L 5/00; G01L 1/165; G01L 3/1421; G01L 1/2287; G01L 3/1442; G01L 5/166; G01L 1/26; G01L 5/162; G01L 5/225; G01L 5/169; G01L 3/1471; G01L 5/009; G01L 1/142; G01L 5/12; G01L 5/0009; G01L 5/0019; G01L 3/1478; G01L 1/127; G01L 1/24; G01L 5/161; G01L 3/242; G01L 3/22; G01L 5/0038; G01L 1/2281; G01L 1/246; G01L 1/16; G01L 1/122; G01L 1/2262; G01L 3/107; G01L 3/1407; G01L 3/1464; G01L 5/0028; G01L 5/0071; G01L 1/225; G01L 3/24; G01L 1/04; G01L 1/18; G01L 5/26; G01L 1/12; G01L 5/13; G01L 1/255; G01L 5/0066; G01L 5/167; G01L 5/0004; G01L 19/04; G01L 5/28; G01L 19/14; G01L 1/162; G01L 5/0023; G01L 5/228; G01L 3/045; G01L 3/06; G01L 3/16; G01L 1/00; G01L 1/2237; G01L 3/1485; G01L 19/147; G01L 19/148; G01L 5/0057; G01L 5/171; G01L 1/146; G01L 1/167; G01L 1/241; G01L 5/0085; G01L 3/1492; G01L 9/0022; G01L 1/144; G01L 1/148; G01L 19/0681; G01L 5/0033; G01L 5/164; G01L 1/2243; G01L 27/002; G01L 3/145; G01L 5/243; G01L 3/26; G01L 5/10; G01L 9/0052; G01L 1/042; G01L 1/2256; G01L 1/2268; G01L 27/007; G01L 3/245; G01L 5/163; G01L 5/288; G01L 1/048; G01L 25/006; G01L 5/008; G01L 9/006; G01L 1/20; G01L 3/1414; G01L 5/136; G01L 1/106; G01L 1/2218; G01L 19/142; G01L 5/106; G01L 5/282; G01L 1/02; G01L 1/06; G01L 1/242; G01L 1/243; G01L 11/025; G01L 13/06; G01L 23/00; G01L 5/0052; G01L 5/0095; G01L 5/108; G01L 5/168; G01L 9/0002; G01L 9/0025; G01L 9/02; G01L 1/205; G01L 11/00; G01L 17/00; G01L 19/00; G01L 19/086; G01L 3/18; G01L 5/107; G01L 5/133; G01L 5/14; G01L 5/173; G01L 5/20; G01L 5/223; G01L 5/246; G01L 9/0033; G01L 9/0072; G01L 9/0092
See application file for complete search history.

(56) References Cited

U.S. PATENT DOCUMENTS

| | | | | |
|---|---|---|---|---|
| 9,821,846 | B2 * | 11/2017 | Schoepe | G01D 5/14 |
| 11,860,053 | B2 * | 1/2024 | Fröhlich | G01L 3/104 |
| 2005/0223820 | A1 | 10/2005 | Murakami et al. | |
| 2023/0109220 | A1 * | 4/2023 | Dreher | G01L 3/104 324/207.12 |
| 2023/0314250 | A1 * | 10/2023 | Fröhlich | B62D 15/0215 73/862.325 |

FOREIGN PATENT DOCUMENTS

| | | | | |
|---|---|---|---|---|
| DE | 102013006379 A1 | 10/2014 | | |
| DE | 102016100236 A1 | * | 7/2017 | G01L 3/104 |
| DE | 102016124370 A1 | 6/2018 | | |
| DE | 102017116454 A1 | 1/2019 | | |
| EP | 1269133 B1 | 5/2004 | | |
| EP | 4242616 A2 | * | 9/2023 | G01L 5/221 |
| WO | 2020/174170 A1 | 9/2020 | | |
| WO | 2020/174171 A1 | 9/2020 | | |
| WO | WO-2023025380 A1 | * | 3/2023 | G01D 11/245 |

OTHER PUBLICATIONS

International Search Report issued in corresponding International Application No. PCT/EP2022/069223 mailed Oct. 19, 2022 (5 pages).

Written Opinion issued in corresponding International Application No. PCT/EP2022/069223 mailed Oct. 19, 2022 (9 pages).

* cited by examiner

TORQUE-SENSOR DEVICE AND METHOD FOR ASSEMBLING A TORQUE-SENSOR DEVICE

BACKGROUND

Torque sensor devices of the generic type, in particular for steering shafts of motor vehicles, are basically known from the prior art, for example from DE 10 2013 006 379 A1 or EP 1 269 133 B1.

Torque sensor devices of this type are used, for example, in electrical steering systems in order to activate the electrical driving motor of the steering system on the basis of a steering torque applied by a driver, for example in order to provide corresponding steering assistance.

Generally, for this purpose, torque sensor devices are used in conjunction with an axially divided shaft and with a torsion bar of defined, known torsional rigidity, wherein the torsion bar connects a first part of the axially divided shaft to a second part of the axially divided shaft.

If a torque is applied to the shaft, this causes twisting of the two parts of the shaft with respect to each other by a measurable angle of twist, wherein the angle of twist arises in a manner dependent on the applied torque and the rigidity of the torsion bar, and therefore the applied torque can be determined from the detected angle of twist if the rigidity of the torsion bar is defined and known.

Various measuring principles and sensor arrangements are known for measuring the angle of twist resulting from an applied torque, wherein use is very frequently made of magnetic sensor devices or systems in which a magnetic arrangement having at least one magnetic element, generally having an encircling ring magnet in the form of a permanent magnet, is connected to the first part of the steering shaft for rotation therewith, and a stator arrangement having one or more magnetically conductive stators is connected to the second part of the shaft for rotation therewith, wherein the stator arrangement is generally arranged in the radial direction concentrically about the magnetic arrangement, in particular the magnetic element, with a small air gap in between. The magnetic flux of a magnetic field generated by means of the magnetic arrangement can be conducted via the stator arrangement, which conventionally comprises two separate stators having in each case a region in the shape of an annular disk, to a magnetic sensor arrangement having at least one magnetic sensor, for example a Hall sensor, and evaluated.

If the magnetic arrangement connected to the first part of the shaft for rotation therewith, in particular the magnetic element of said magnetic arrangement, is moved by a rotational movement of the shaft relative to the stator arrangement connected to the second part of the shaft, the magnetic flux density in the stator arrangement, in particular in the individual stators, changes, which can be detected by means of the magnetic sensor arrangement. The change in the magnetic flux density in the stator arrangement is dependent here, inter alia, on the size of the relative movement of the magnetic arrangement, in particular of the respective magnetic elements, in relation to the stator arrangement, in particular in relation to the individual stators, that is to say on the angle of twist. A conclusion can thus be drawn regarding the angle of twist from the change in the detected flux density and, from the angle of twist in turn, with knowledge of the torsional rigidity of the torsion bar, the torque applied to the shaft can be determined.

Superimposition of the magnetic field generated by the magnetic arrangement of the torque sensor device with a further magnetic field, which for the magnetic field of the sensor device constitutes a magnetic interference field, for example with a magnetic field of a further sensor device or with a magnetic field which is present in the surroundings of the torque sensor device, for example with a magnetic field of an electrical machine located in the vicinity, for example the magnetic field of an electric motor or generator, or of high-current lines, can cause undesired influencing of the flux transmitted to the magnetic sensor device, in particular to a change, caused by the further magnetic field, in the transmitted flux density, leading to a sensor signal which is erroneous but plausible and which is therefore not recognized as being incorrect and consequently leading to an erroneous torque value.

Various measures are known from the prior art for reducing the sensitivity of above-described torque sensor devices of the generic type to interference.

WO 2020/174170 A1 and WO 2020/174171 A1, for example, in each case disclose position sensors, in particular for detecting the torsion of a steering column, with which a reduction in magnetic interference influences is intended to be achieved by a special configuration of the flux guides, wherein the described position sensors each comprise a rotor structure, a stator structure and a collector structure, wherein the collector structure has two flux guides defining at least one air gap in which at least one magnetic-sensitive element is arranged, the flux guides and the air gap between them defining a magnetic permeance, irrespective of the relative radial and angular position of the stator structure with respect to the collector structure, and wherein the flux guides each comprise an angular collector sector and each flux guide has at least one primary collection zone, which is continued by at least one extension having at least one secondary collection zone, the secondary collection zones ending in flat extensions or in pole shoes forming the two poles of the air gap, and a transverse center plane of the air gap intersects at least one of the extensions.

The applicant's EP 20192858.7, which has not yet been published at the time of the application, furthermore discloses a torque sensor device for detecting a torque applied to a shaft, which comprises a magnetic arrangement, a stator arrangement and a flux guide arrangement, wherein the flux guide arrangement has a first flux guide and a second flux guide, and the first flux guide and the second flux guide each have a first collection surface and each have at least one transmission surface, wherein the second flux guide furthermore has a second collection surface which is magnetically conductively coupled to the at least one transmission surface of the second flux guide, wherein the first flux guide and the second flux guide are each configured and arranged relative to one another such that, if the torque sensor device is surrounded by a magnetic interference field, a first interference flux component, which is at least partially concentrated in the first collection surface of the first flux guide and transmitted to the magnetic sensor via the at least one transmission surface of the first flux guide, and a second interference flux component of the second magnetic flux, which component is at least partially concentrated in the second collection surface of the second flux guide and transmitted via the at least one transmission surface of the second flux guide to the magnetic sensor, at least partially cancel each other out.

For a high degree of sensor accuracy, damage to the individual components should be avoided when installing a torque sensor device, in particular damage to the flux guides, such as bending or the like. Furthermore, for achieving a high degree of sensor accuracy, it is advantageous if precise positioning and/or alignment of the individual components, in particular the flux guides relative to one another or to the magnetic sensor, can be reliably achieved during the installation. This usually makes the installation of torque sensor devices described above expensive or awkward. In particular, the installation of torque sensor devices with flux guides with additional collection surfaces, such as those known for example from WO 2020/174170 A1 and WO 2020/174171 A1 as well as EP 20192858.7, is frequently a challenge.

For a simple installation of a torque sensor device of the type in question, DE 10 2005 018 286 A1 proposes that the flux guides and the magnetic field sensor first of all be pre-assembled on a common holder and then the pre-assembled assembly be assembled with the other components, in particular with the stator holder, the stator elements and the multipole magnetic ring.

DE 10 2016 124 370 A1 furthermore discloses a sensor device for a rotatable shaft, in particular for a steering shaft of a motor vehicle, and a corresponding method for assembling such a sensor device, wherein the sensor device has a torque sensor device for detecting a torque applied to the shaft, and a steering angle sensor device for detecting an angle of rotation of the shaft, wherein the torque sensor device has at least one magnetic device for generating a magnetic field and at least one first magnetic sensor for generating a sensor signal depending on a torque applied to the shaft, wherein the steering angle sensor device has at least one rotor, which is connectable to the shaft for rotation therewith, and an angle sensor device for generating at least one sensor signal depending on an angle of rotation of the rotor, and wherein the sensor device has at least one assembly pre-assembled to form a sensor module, and wherein at least the first magnetic sensor of the torque sensor device and the angle sensor device of the steering angle sensor device are part of the assembly pre-assembled to form the sensor module.

SUMMARY

Against this background, it is an object of the invention to provide an alternative torque sensor device, in particular a torque sensor device which is easier to install and where the influence of at least one external magnetic interference field, which is present in the surroundings of the torque sensor device, on a torque value that is to be determined is reduced.

Furthermore, it is an object of the present invention to provide an alternative method for at least partially assembling a torque sensor device, in particular a particularly simple method, which nevertheless however allows a precise assembly or a precise installation of a torque sensor device, and with which, above all, also torque sensor devices can be precisely and easily installed, with which, because of additionally present collection surfaces, an interference influence of a magnetic interference field surrounding the torque sensor device can be reduced.

These objects are achieved by a torque sensor device according to the invention and by a method according to the invention having the features according to the respective independent patent claims. Advantageous embodiments of the invention are the subject matter of the dependent patent claims, the description and the figures, and will be explained in more detail below.

A torque sensor device according to the invention is designed for detecting a torque applied to a shaft, in particular for detecting a torque applied to a steering shaft of a motor vehicle, and has a magnetic arrangement, a stator arrangement, a flux guide arrangement and a magnetic sensor arrangement comprising at least one magnetic sensor. The magnetic arrangement is configured to generate at least one magnetic field, and the flux guide arrangement has at least one first flux guide and a second flux guide, wherein the first flux guide and the second flux guide each have at least one transmission surface, and the at least one transmission surface of the first flux guide and the at least one transmission surface of the second flux guide lie opposite one another in such a way that they form an axial gap between them in which at least one magnetic sensor of the magnetic sensor arrangement can be arranged. In a functional use state of the torque sensor device, in particular in a state of the torque sensor device in which it is mounted on a shaft, the magnetic arrangement and the stator arrangement are movable relative to each other in the circumferential direction about a center axis of the torque sensor device as a result of a torque being applied, in such a way that a relative movement between the magnetic arrangement and the stator arrangement in a circumferential direction enables a magnetic flux to be generated in the stator arrangement.

A torque sensor device according to the present invention comprises here a plurality of assemblies, including at least one first assembly with a first housing part and a second assembly with a second housing part, wherein a torque sensor device according to the invention is characterized in that the first pre-assembled assembly comprises at least the first housing part, the stator arrangement and at least one magnetic sensor of the magnetic sensor arrangement, the second pre-assembled assembly comprises at least the second housing part, the first flux guide and the second flux guide, and the second housing part is pushable or pluggable onto the first housing part and/or is at least partially pushable or insertable together with the first housing part, wherein, during the pushing or plugging on and/or at least partially pushing or inserting together, at least one magnetic sensor is introducible into the gap between the transmission surfaces of the first flux guide and the second flux guide in such a way that, in a functionally assembled state of the torque sensor device, in which at least the first pre-assembled assembly and the second pre-assembled assembly are functionally assembled, a magnetic flux generated in the stator arrangement is detectable by means of the magnetic sensor.

A torque sensor device according to the invention can be installed particularly easily and with a low risk of damage to the flux guides, and, in the event of an appropriate configuration of the flux guides, even with flux guides that permit at least partial compensation for an interference flux. Furthermore, a precise arrangement of the flux guide arrangement relative to the magnetic sensor arrangement can be particularly easily achieved. Simple positioning and alignment of the flux guide arrangement relative to the magnetic sensor arrangement can be achieved particularly easily and advantageously via the first housing part, which is part of the first pre-assembled assembly, and via the second housing part, which is part of the second pre-assembled assembly.

In particular, the pre-assembly of the magnetic sensor assembly together with the first housing part, the stator arrangement, to form a first pre-assembled assembly, but separately and independently of the flux guide arrangement, which according to a method according to the invention is pre-assembled with the second housing part to form a second assembly, and provided that the flux guide arrangement is appropriately configured, especially for a flux guide arrangement with flux guides, as are known, for example, from WO 2020/174170 A1, WO 2020/174171 A1 or EP 20192858.7, in particular also in the case of flux guides with an additional collection surface, in particular with two collection surfaces each, as is known from EP 20192858.7, permits simple and precise installation of the torque sensor device and permits this to be undertaken in particular also with little risk of damage to the flux guide arrangement.

By pre-assembling the two flux guides or the flux guide arrangement with the second housing part, the risk of damage to the flux guides or to the flux guide arrangement, for example by bending the flux guides during installation, can be particularly effectively reduced. This can be reduced even further the more the flux guides or the flux guide arrangement are/is enclosed by the second housing part after the pre-assembly or the more the flux guides or the flux guide arrangement are/is surrounded by the second housing part after the pre-assembly.

Torque sensor devices of the type in question for detecting a torque applied to a shaft, in particular for detecting a torque applied to a steering shaft of a motor vehicle, in particular the functioning of said torque sensor devices, are basically known to a person of relevant skill in the art from the prior art. In particular from DE 10 2013 006 379 A1 or EP 1 269 133 B1, to which reference is hereby expressly made for further information regarding the basic functioning of a torque sensor device according to the invention.

A torque sensor device assembled by a method according to the invention or a torque sensor device according to the invention is, as is basically known from the prior art, in particular designed to be fastened on the shaft with its center axis concentric to the axis of rotation of the shaft. Particularly preferably, a torque sensor device according to the invention is configured here to detect a torque applied to a shaft, wherein the shaft has a first part and a second part, which is rotatable relative to the first part, and in particular the first part and the second part of the shaft are connected to each other by means of a torsion bar. A torque sensor device according to the invention is preferably configured here to detect the torsion of the first part of the shaft in relation to the second part of the shaft. The applied torque can be determined from the detected torsion of the shaft if the torsional rigidity of the torsion bar of the shaft is known.

The magnetic arrangement preferably forms here a further assembly and has in particular at least one magnetic element for generating at least one magnetic field and, in particular, the at least one magnetic element of the magnetic arrangement can be arranged in particular concentrically with respect to the shaft, that is to say in such a manner that the center axis of the torque sensor device is aligned with the axis of rotation of the shaft, wherein the magnetic arrangement, in particular the at least one magnetic element of the magnetic arrangement, is connectable in particular to a first part of the shaft for rotation therewith.

In an advantageous refinement of a torque sensor device according to the invention, it is the case in particular that a polarity of the magnetic arrangement, in particular of the at least one magnetic element, is constant in an axial direction. This makes it possible to produce the magnetic element particularly easily and thus inexpensively.

The at least one magnetic element of the magnetic arrangement is preferably a permanent magnet, in particular a completely closed ring magnet or a magnet which is similar to a ring magnet and which is virtually closed in a circumferential direction, wherein the magnetic element may in particular have a plurality of ring magnet segments of opposite polarity or corresponding pole pairs which are arranged adjacently to one another in each case with opposite polarity in the circumferential direction, with in particular two mutually adjacent portions of opposite polarity forming a pole pair.

If the magnetic arrangement has one or more further magnetic elements, the latter are particularly preferably likewise configured as previously described and are in particular arranged concentrically with respect to the at least one magnetic element.

Here, within the context of the invention, a "magnet which is similar to a ring magnet" is understood as meaning a magnet, in particular a permanent magnet, which, although not completely closed in the circumferential direction, is configured in such a manner that it virtually, in particular completely, acts like a completely closed ring magnet.

In an advantageous refinement, the magnetic arrangement which is configured to generate at least one magnetic field is configured here in particular to generate a magnetic working field, wherein, in a functional state of use of the torque sensor device, i.e. in particular in a state completely mounted on a shaft, as a result of a torque being applied in the circumferential direction about a center axis of the torque sensor device, the magnetic arrangement and the stator arrangement are preferably movable relative to each other in such a way that, by means of the relative movement between the magnetic arrangement and the stator arrangement in the circumferential direction, depending on the torque applied to the torque sensor device, in particular at least one magnetic working flux can be generated in the stator arrangement. Furthermore, in an advantageous refinement, if the torque sensor device is surrounded by a magnetic interference field, depending on the magnetic interference field surrounding the torque sensor device, a first interference magnetic flux can preferably also be generated in the stator arrangement.

The stator arrangement can preferably likewise be arranged concentrically with respect to the shaft and is in particular connectable to a second part of the shaft for rotation therewith.

In an advantageous refinement of a torque sensor device according to the invention, in a functional state of use of the torque sensor device, i.e. in particular in a state completely mounted on a shaft, the stator arrangement is arranged or can be arranged in principle in particular at least partially concentrically with respect to the magnetic arrangement, in particular concentrically with respect to the at least one magnetic element, wherein the stator arrangement can be or is in particular at least partially arranged on the outside around the magnetic arrangement, preferably around the at least one magnetic element and in particular with a defined air gap in between.

The stator arrangement serves in particular, and is preferably configured, to conduct a magnetic flux of the magnetic field generated by the magnetic arrangement to the flux guide arrangement.

In an advantageous refinement of a torque sensor device according to the invention, the stator arrangement has in particular a first stator and a second stator which are each arranged concentrically with respect to one another along the center axis, wherein, in a functional state of use of the torque sensor device, by means of a relative movement between the magnetic arrangement and the stator arrangement in a circumferential direction, a magnetic flux can be generated in the stator arrangement, in particular one magnetic flux in the first stator and one magnetic flux in the second stator respectively, in particular simultaneously.

In an advantageous refinement of a torque sensor device according to the invention, the first and/or the second stator have/has in particular an annular-disk-shaped stator body and tabs which extend away from said stator body in an axial direction, wherein the tabs are in particular arranged so as to be distributed, in particular uniformly distributed with spacings in between, in a circumferential direction, wherein the tabs in particular extend in each case away from the associated stator body in an axial direction, wherein the first stator and the second stator are preferably configured and arranged in such a manner that the tabs of the first stator and of the second stator each extend in the axial direction from the associated stator body in the direction of the other stator, and in particular each engage in an offset manner with the tabs of the other stator.

In an advantageous refinement of a torque sensor device according to the invention, the stator body of the first and/or the second stator has in particular in each case a radially inner edge and a radially outer edge, wherein the tabs in particular extend away from the radially inner edge of the annular-disk-shaped stator body, in particular all to the same side, that is to say in the same direction.

Further, the stator arrangement may have further components, such as in particular a stator holder and/or one or more fixing rings. In an advantageous refinement, the stator arrangement in particular has a stator holder onto which the stators can be pushed and can be fixed in their axial position by means of a fixing ring. For fastening the stator holder with the stators on the one part of the shaft, the torque of which is intended to be detected, the stator holder may in particular have a sleeve-shaped fastening portion, which can be fastened to the shaft for rotation therewith in a manner known from the prior art.

The number of pole pairs in the circumferential direction of the at least one magnetic element of the magnetic arrangement particularly preferably corresponds to the number of tabs of the first and/or the second stator. For torque sensor devices for steering shafts of motor vehicles, in particular for use in passenger motor vehicles, a number of 8 tabs for the first stator and the second stator has proven particularly advantageous.

The flux guide arrangement of a torque sensor device according to the invention is in particular configured to at least partially concentrate and to transmit, and preferably also to amplify, a magnetic flux, in particular the magnetic flux that is generated in the stator arrangement, to the magnetic sensor arrangement, wherein, for this purpose, the first flux guide and/or the second flux guide preferably in addition to their in each case at least one transmission surface can in particular furthermore in each case have a first collection surface, said collection surfaces being able to be designed in particular in each case to at least partially concentrate and/or to at least partially transmit a magnetic working flux generated in the stator arrangement depending on an applied torque and/or a first magnetic interference flux generated depending on a magnetic interference field surrounding the torque sensor device.

The at least one transmission surface of the first flux guide and the at least one transmission surface of the second flux guide are arranged opposite each other in such a way that they form an axial gap between them, in particular an air gap in which at least one magnetic sensor of the magnetic sensor arrangement can be arranged or is arranged in a functionally assembled state of the torque sensor device, wherein, in particular, in a state of the torque sensor device assembled by a method according to the invention, at least one magnetic sensor of the magnetic sensor arrangement is arranged in the gap between the transmission surfaces.

If at least one magnetic sensor of the magnetic sensor arrangement is arranged in the gap, a first magnetic flux concentrated in the first flux guide can be transmitted to the magnetic sensor arranged in the axial gap, preferably via the at least one transmission surface of the first flux guide, wherein the first magnetic flux can in particular contain a working flux component and/or a first interference flux component, and a second magnetic flux concentrated in the second flux guide can preferably be transmitted to the magnetic sensor via the at least one transmission surface of the second flux guide.

The magnetic sensor arrangement has in particular at least one first magnetic sensor for detecting the magnetic flux which is concentrated, and preferably also amplified and transmitted, by the flux guide arrangement, wherein the magnetic sensor arrangement, in particular at least one magnetic sensor of the magnetic sensor arrangement, is configured to generate a sensor signal in a manner dependent on a torque that is applied to the torque sensor device and/or in a manner dependent on a torque that is applied to a shaft that is connected to the torque sensor device. The magnetic sensor arrangement may comprise here one or more magnetic sensors, in particular a first magnetic sensor and furthermore a second magnetic sensor.

At least one magnetic sensor, preferably at least one first and one second magnetic sensor, in particular all of the magnetic sensors of the magnetic sensor arrangement, is/are a simple Hall sensor with which a magnetic flux density, running perpendicularly to the sensor surface of the Hall sensor, of a magnetic field, or a component of the magnetic flux density, running perpendicularly to the sensor surface, of the magnetic field can be detected, wherein, particularly preferably, at least the first magnetic sensor, in particular all of the magnetic sensors, is/are arranged fixedly with respect to the housing, that is to say in a stationary or positionally fixed manner in relation to the rotatable shaft.

The magnetic sensor arrangement of a torque sensor arrangement according to the invention may in particular also have two or more magnetic sensors, in particular a first and a second magnetic sensor. This makes it possible in particular for the torque sensor signal to be evaluated or provided redundantly, and thus allows increased functional reliability of the torque sensor device.

If a torque sensor device according to the invention has a first magnetic sensor and a second magnetic sensor, the second magnetic sensor is particularly preferably arranged parallel to the first magnetic sensor, preferably in a plane with the first magnetic sensor, in particular in a common plane that is perpendicular to the central axis. This makes it possible for the two magnetic sensors to be fastened on a common board or printed circuit board, in particular if the two magnetic sensors are SMD magnetic sensors, wherein the printed circuit board in this case preferably extends in a plane that is perpendicular to the central axis.

In this case, a flux guide has in particular two transmission surfaces, wherein the two transmission surfaces of a flux guide are preferably arranged in a plane.

If the magnetic sensor arrangement has a plurality of magnetic sensors, at least one flux guide has in particular a plurality of transmission surfaces, in particular a respectively associated transmission surface for each magnetic sensor, wherein, in this case, a first collection surface, and if present a second collection surface, are in particular each magnetically conductively coupled, in particular magnetically conductively connected, to the transmission surfaces of the associated flux guide, and the flux guide is configured, in such a way that a respective magnetic flux that is concentrated and/or amplified in the associated flux guide can be transmitted in accordance with the present invention preferably via each of the transmission surfaces to the magnetic sensor arrangement, in particular to a magnetic sensor, assigned to the respective transmission surface, of the magnetic sensor arrangement. That is to say, in the case of two magnetic sensors, the first flux guide preferably has a first transmission surface and also a second transmission surface for transmitting and/or conducting the magnetic flux that is concentrated in the associated flux guide.

It is however also possible for a plurality of magnetic sensors to be arranged adjacent to one and the same transmission surface, that is to say to receive a first and/or second magnetic flux via the same common transmission surface. For example, the first flux guide may have a transmission surface for two magnetic sensors arranged in a common plane and the second flux guide may likewise have a common transmission surface opposite the transmission surface of the first flux guide. The second flux guide may however for example also have two individual separate transmission surfaces which each form a gap with the common transmission surface, in which gap in each case one magnetic sensor is or can be arranged. Likewise, the first flux guide may have two individual transmission surfaces which may be arranged opposite two individual transmission surfaces of the second flux guide or opposite one common transmission surface of the second flux guide.

It is however particularly preferable for the two flux guides to each have two transmission surfaces, with in each case one transmission surface of the first flux guide being arranged parallel to a transmission surface of the second flux guide, said transmission surfaces preferably being arranged one above the other with a gap in between, into which gap a respective magnetic sensor projects in a radial direction. It is preferable here if a first magnetic sensor is arranged in particular in an axial gap between the first transmission surfaces of the two flux guides and extends in a radial direction into the gap between the first transmission surfaces, in particular parallel to the first transmission surfaces, while a second magnetic sensor projects in particular into the axial gap between the two transmission surfaces of the two first and second flux guides.

In an advantageous refinement of a torque sensor device according to the present invention, the first flux guide and the second flux guide, in particular the entire flux guide arrangement, are/is inserted into the second housing part and connected thereto, in particular fastened thereto, for example by latching, clipping-in, and/or calking and/or at least partially overmolding the flux guides or the flux guide arrangement. If the flux guides or the flux guide arrangement are/is at least partially connected to the second housing part by partial overmolding, it is advantageous if the first flux guide and/or the second flux guide have corresponding tabs, in particular double-angled tabs or the like.

In a particularly advantageous refinement of a torque sensor device according to the invention, at least the first flux guide and/or the second flux guide are/is connected to the second housing part, in particular fastened thereto, in such a way that, when assembling the first pre-assembled assembly with the second pre-assembled assembly, in particular when pushing or plugging the second housing part onto the first housing part or the second pre-assembled assembly onto the first pre-assembled assembly, or when at least partially pushing or inserting them together, dropping of the flux guides out of the second housing part is avoided.

Within the context of the present invention, "pushing on" is understood as meaning in particular engagement of the two housing parts together by displacement of the two housing parts relative to each other, in particular along a straight line, in which the second housing part at least partially engages around the first housing part from the outside even during the displacement, i.e. before a target position is reached. The second housing part can be guided here in particular by the first housing part during the displacement.

Within the context of the present invention, "plugging on" is understood as meaning in particular engagement of the two housing parts together by displacement of the two housing parts relative to each other, in particular along a straight line, in which one of the two housing parts partially engages around the other housing part from the outside in the target position, in particular essentially only in the target position.

Within the context of the present invention, "pushing together" is understood as meaning in particular engagement of the two housing parts together by displacement of the two housing parts relative to each other, in particular along a straight line, in which one housing part at least partially engages around the other from the outside even during the displacement, i.e. before a target position is reached, and the other already protrudes at least partially into it during the displacement. The outer housing part can be guided here in particular by the inner housing part during the displacement.

Within the context of the present invention, "plugging together" is understood as meaning in particular engagement of the two housing parts together by displacement of the two housing parts relative to each other, in particular along a straight line, in which one housing part at least partially engages around the other from the outside in the target position and the other in the target position protrudes at least partially into it, in particular in each case only in the target position.

In one possible advantageous refinement, a torque sensor device according to the invention, in particular the first pre-assembled assembly and the second pre-assembled assembly, may be designed here in such a way that, when the second housing part is pushed or plugged onto the first housing part or the second pre-assembled assembly is pushed or plugged onto the first pre-assembled assembly, or when the first and second housing parts or the two pre-assembled assemblies are at least partially pushed together or inserted together, at least one magnetic sensor of the magnetic sensor arrangement is introduced into the gap between the transmission surfaces of the first flux guide and the second flux guide in such a way that, in a functionally assembled state of the torque sensor device, in which at least the first pre-assembled assembly and the second pre-assembled assembly are functionally assembled, a magnetic flux generated in the stator arrangement can be detected by means of the magnetic sensor. This makes it possible in a particularly simple manner not only to achieve simple installation of the flux guides, in particular simple and precise positioning of the flux guides, but also in a simple way to achieve precise positioning of the flux guides relative to at least one magnetic sensor.

In another possible, in particular alternative advantageous refinement, however, a torque sensor device according to the invention may be already assembled, with it being possible in particular for the first pre-assembled assembly and the second pre-assembled assembly to already be assembled, in particular according to function or according to use. In this case, preferably, the second housing part is pushed or plugged onto the first housing part or the second pre-assembled assembly is pushed or plugged onto the first pre-assembled assembly, or the two first and second housing parts or the two first and second pre-assembled assemblies are at least partially pushed together or inserted together, such that at least one magnetic sensor of the magnetic sensor arrangement is introduced into the gap between the transmission surfaces of the first flux guide and the second flux guide in such a way that, in a functionally assembled state of the torque sensor device, a magnetic flux generated in the stator arrangement can be detected by means of the magnetic sensor. That is to say that a torque sensor device according to the invention may be present in the form of a kit with at least two separate, pre-assembled assemblies: the first pre-assembled assembly and the second pre-assembled assembly. The magnetic arrangement can form another separate assembly. Or else, the assemblies may be already assembled, with in particular the first pre-assembled assembly and the second pre-assembled assembly being assembled. Also, the first assembly and the second assembly may already be assembled with the magnetic arrangement in a further possible refinement. However, the magnetic arrangement may not yet be assembled with the first and second assemblies either, even if the first and second assemblies are already assembled.

In another possible, in particular advantageous refinement of a torque sensor device according to the present invention, the second pre-assembled assembly is pushable or pluggable onto the first housing part in a plane extending perpendicular to the center axis of the torque sensor device in the tangential direction or in a plane extending perpendicular to the center axis of the torque sensor device in the radial direction, and/or is at least partially pushable or insertable together with the first housing part. This permits particularly simple installation with a simple design of the individual components, in particular the two housing parts.

All the directional details in this application, such as axially, tangentially or radially, refer in each case to the center axis of the torque sensor device. In the axial direction therefore means consequently a direction along or parallel to the center axis. In the radial direction correspondingly means a direction perpendicular to the center axis, but intersecting the center axis, in a plane perpendicular to the center axis. In the tangential direction means accordingly in a direction perpendicular to a radial direction and to an axial direction. An “axial gap” is therefore a gap in the axial direction, i.e. a gap which extends in the axial direction, i.e. in a direction parallel to the center axis of the torque sensor device. The directional detail “circumferential direction” refers accordingly to a direction of rotation about this axis of rotation or center axis.

In a further possible, in particular advantageous refinement of a torque sensor device according to the present invention, the second housing part is at least partially open at least on a bottom side, wherein preferably at least the first flux guide and/or the second flux guide, in particular the entire flux guide arrangement, is introduced, in particular is inserted, from the open bottom side into the second housing part, and wherein the bottom side of the second housing part extends at least substantially in a plane parallel to a tangent of a circle about the center axis of the torque sensor device. This allows simple installation of the torque sensor device and a particularly compact and therefore space-saving design to be achieved.

In a further possible, in particular advantageous refinement of a torque sensor device according to the present invention, in particular in a development, the second housing part can also be open on the bottom side and on the side, wherein at least the first flux guide and/or the second flux guide, in particular the entire flux guide arrangement, has been introduced, in particular has been inserted, from the open bottom side or from the open side into the second housing part, and wherein the open side of the second housing part extends at least substantially perpendicular to the tangent of the circle about the center axis of the torque sensor device. This allows particularly simple installation of the torque sensor device and also a particularly compact and therefore space-saving design to be achieved.

Within the context of the present invention, a bottom side of the second housing part is understood as meaning in particular a side of the second housing part facing the center axis in a functionally assembled state of the torque sensor device. A “side” of the second housing part is in particular an outer side or “boundary” of the housing part extending substantially perpendicular thereto.

In a further possible, in particular advantageous refinement of a torque sensor device according to the present invention, the first housing part and/or the second housing part have/has means for aligning the two housing parts relative to each other and/or for guiding and/or for aligning them during assembly, in particular for guiding and/or for aligning them during a displacement of the second pre-assembled assembly from an engagement position into a target position. For this purpose, the first housing part and/or the second housing part can have, for example, one or more stop elements and/or guide elements, such as one or more guide rails, guide grooves, guide pins, positioning pins and/or positioning pin receptacles or the like, wherein the means provided for this purpose on in each case one of the two housing parts are designed in particular in a manner corresponding to the means provided on the other housing part in each case for this purpose and can be brought into engagement in each case therewith.

For the fixing, in particular of the second housing part in the target position, the first housing part and/or the second housing part can in particular have latching means, such as one or more latching lugs, latching projections, latching hooks or the like, and/or have clips and/or one or more screw receptacles, and can be able to be screwed together and/or can be able to be adhesively bonded or can be able to be fixed in some other way.

In a further possible, in particular advantageous refinement of a torque sensor device according to the present invention, in particular in a development, the magnetic sensor arrangement furthermore has a printed circuit board, in particular a printed circuit board extending perpendicular to the center axis, wherein at least one magnetic sensor is fastened to the printed circuit board and the printed circuit board has a cutout, in particular a slotted recess or a passage opening, or a region of reduced thickness compared to a surrounding region, wherein the at least one magnetic sensor fastened to the printed circuit board is arranged in the region of the cutout or in the region of reduced thickness, and wherein the at least one magnetic sensor of the magnetic sensor arrangement and the cutout or the region of reduced thickness of the printed circuit board is located in the gap between the transmission surfaces of the two flux guides. Thus, a distance between the two opposite transmission surfaces or a gap width in the axial direction can be reduced, in particular minimized, in a simple manner, which in particular has an advantageous effect on the construction height of the torque sensor device in the axial direction in the region of the magnetic sensor.

In a particularly preferred refinement of a torque sensor device according to the invention, each magnetic sensor is assigned here a cutout or a region of reduced thickness.

A reduction in thickness of the printed circuit board may be achieved for example by means of corresponding grooves, which are formed in particular on a bottom side of the printed circuit board, or one or more cutouts in said region, into which, in particular, the transmission surfaces that face toward the bottom side of the printed circuit board can engage or project.

Preferably, at least one transmission surface of at least one flux guide or at least one transmission portion of a flux guide is arranged here in the region of the cutout, in particular at least partially in a plane with the printed circuit board.

If a cutout is provided, this particularly preferably extends in the tangential direction or in the radial direction and is in particular a slot extending in the tangential direction or in the radial direction or a U-shaped or rectangular cutout open on a short side, wherein the cutout in particular is a slot extending in the tangential direction when the second pre-assembled assembly can be or has been assembled with the first assembly by tangential displacement, and a radial slot, if the second pre-assembled assembly can be or has been assembled with the first assembly by radial displacement.

A "tangential slot" is here a slot into which a transmission surface or a transmission portion of one of the flux guides can be introduced from the opening side of the slot by tangential displacement. A "radial slot" is accordingly a slot into which a transmission surface or a transmission portion of one of the flux guides can be introduced from the opening side of the slot by radial displacement.

A torque sensor device according to the invention is particularly preferably configured such that the magnetic sensors are arranged in a plane, in particular on one and the same printed circuit board or board. This yields a particularly advantageous design of a torque sensor device according to the invention. If SMD magnetic sensors are used, a torque sensor device with a small structural height and thus a small structural space requirement in an axial direction, that is to say in the direction of the central axis, can be provided.

In a particularly advantageous refinement of a torque sensor device according to the invention, at least one magnetic sensor of the magnetic sensor arrangement, in particular at least one first and one second magnetic sensor, is in particular in each case an SMD magnetic sensor, because this is particularly effective in saving space or structural space, wherein the magnetic sensor is in particular arranged on a printed circuit board which is oriented with its printed circuit board plane normally with respect to the central axis of the stator arrangement or of the torque sensor device. This makes it possible to achieve a particularly compact design of a torque sensor device according to the invention.

"SMD" stands for Surface-Mounted Device (surface-mounted element), wherein, by contrast to previously described "wired" components which are provided for Through Hole Technology (THT), SMD components do not have any wire connections but instead can be soldered directly onto a printed circuit board by means of solderable transmission surfaces.

In an alternative refinement of a torque sensor device according to the invention, it is however also possible for at least one magnetic sensor of the magnetic sensor arrangement to be a wired magnetic sensor with connection pins, wherein, in this case, the magnetic sensor is preferably arranged such that the connection pins point outward in a radial direction. In this way, even with one or more wired magnetic sensors, it is possible to achieve a compact arrangement, in particular if the connection pins of the wired magnetic sensor are soldered onto a printed circuit board that is oriented with its circuit board plane parallel to the central axis of the stator arrangement or of the torque sensor device. Alternatively, the connection pins may also be connected to a leadframe, in particular may be plugged directly into the latter, in particular to a leadframe which is oriented with its leadframe plane parallel to the central axis of the stator arrangement. This makes it possible to achieve a compact arrangement even with wired magnetic sensors.

In a further possible, in particular advantageous embodiment of a torque sensor device according to the present invention, a magnetic working flux can be generated in the stator arrangement depending on the torque applied to the torque sensor device and, furthermore, a first magnetic interference flux can be generated depending on an interference magnetic field surrounding the torque sensor device, wherein the first flux guide and the second flux guide furthermore each have a first collection surface, said collection surfaces each being designed to at least partially concentrate and/or to at least partially transmit the magnetic working flux generated in the stator arrangement depending on an applied torque and/or the first magnetic interference flux generated depending on a magnetic interference field surrounding the torque sensor device, wherein the flux guide arrangement, in particular the first flux guide and/or the second flux guide, furthermore has preferably at least one second collection surface which is magnetically conductively coupled to at least one transmission surface and is designed to generate or to at least partially concentrate and/or transmit a second magnetic interference flux depending on a magnetic interference field surrounding the torque sensor device, and wherein the flux guide arrangement is designed in particular in such a way that, when the torque sensor device is surrounded by a magnetic interference field, a first interference-flux component which is at least partially concentrated in the first collection surface of one of the flux guides and is transmitted to the magnetic sensor via the at least one associated transmission surface of said flux guide and a second interference-flux component of the magnetic flux that is at least partially concentrated in the second collection surface and is transmitted to the magnetic sensor via an associated transmission surface of the other flux guide at least partially cancel each other out, in particular in the gap formed by the transmission surfaces.

For this purpose, the first flux guide and the second flux guide are particularly preferably designed accordingly and are accordingly arranged relative to each other. This effect can be achieved in principle with a flux guide arrangement, as configured, for example, in the torque sensor devices described in WO 2020/174170 A1 or WO 2020/174171 A1 or with a flux guide arrangement according to EP 20192858.7, to which reference is made in particular for further details regarding the interference compensation per se.

Instead of being bent in a Z-shaped manner in each case, as shown in particular in EP 20192858.7, i.e. with a second collection surface extending outward in the radial direction, one or both flux guides may also be bent in a U-shaped manner, so that the second collection surfaces extend inward in the radial direction, as shown in the accompanying figures of this application.

The only matter of importance in a preferred refinement with a design of the flux guides reducing a magnetic interference influence is that a described interference compensation is at least partially achieved and that the assembling according to the invention is possible after the pre-assembly of the two assemblies, in particular by tangential or radial displacement of the second pre-assembled assembly relative to the first pre-assembled assembly.

In a particularly advantageous refinement, for the above-described purpose of reducing the interference influence of a magnetic interference field in the surroundings of the torque sensor device, the second flux guide has a second collection surface which is magnetically conductively coupled to the at least one transmission surface of the second flux guide and which is configured to generate and/or to at least partially concentrate and conduct a second magnetic interference flux in a manner dependent on a magnetic interference field surrounding the torque sensor device, wherein the first flux guide and the second flux guide are each configured and arranged relative to one another such that, if the torque sensor device is surrounded by a magnetic interference field, a first interference flux component of the first magnetic flux, which component is at least partially concentrated in the first collection surface of the first flux guide and transmitted via the at least one transmission surface of the first flux guide to the magnetic sensor, and a second interference flux component of the second magnetic flux, which component is at least partially concentrated in the second collection surface of the second flux guide and transmitted via the at least one transmission surface of the second flux guide to the magnetic sensor, at least partially cancel one another out, in particular in the gap formed by the transmission surfaces.

In a particularly advantageous refinement of a torque sensor device according to the present invention, the first flux guide furthermore likewise has a second collection surface, wherein the second collection surface of the first flux guide is magnetically conductively coupled to the at least one transmission surface of the first flux guide and is likewise configured to generate and/or to at least partially concentrate and conduct a second magnetic interference flux in a manner dependent on a magnetic interference field surrounding the torque sensor device, wherein the first flux guide and the second flux guide are each configured and arranged relative to one another such that, if the torque sensor device is surrounded by a magnetic interference field, a first interference flux component of the second magnetic flux, which component is at least partially concentrated in the first collection surface of the second flux guide and transmitted via the at least one transmission surface of the second flux guide to the magnetic sensor, and a second interference flux component of the first magnetic flux, which component is partially concentrated in the second collection surface of the first flux guide and transmitted via the at least one transmission surface of the first flux guide to the magnetic sensor, at least partially cancel one another out.

By means of such a flux guide arrangement with at least one flux guide with two collection surfaces, a magnetic flux which is generated by a magnetic interference field and concentrated in the flux guide arrangement, and which leads or would lead to undesired influencing or falsification of a torque sensor signal generated by the torque sensor device, can in each case be reduced or, in the case of a corresponding design of the flux guide arrangement and a correspondingly configured external magnetic interference field, that is to say if a magnetic interference field that is correspondingly configured in particular in terms of its direction surrounds the torque sensor device, can even be eliminated entirely. This is even the case in particular in the absence of a second, imperatively required magnetic sensor and/or a second magnetic element and/or in the absence of an additional sensor as has been proposed above, for example, in the above solutions from the that are mentioned by way of example.

In particular, by means of an advantageous arrangement of the two collection surfaces and of the transmission surface of the second flux guide relative to the at least one transmission surface and the collection surface of the first flux guide, it is possible, in particular in conjunction with advantageous coordination of the sizes of the collection surfaces, to reduce and in some cases even completely compensate an interference flux component generated by a surrounding magnetic interference field.

The first flux guide and the second flux guide, in particular the collection surface(s) and transmission surface(s) thereof, are preferably in each case configured and arranged relative to one another and magnetically conductively coupled to one another, and particularly preferably coordinated in terms of size with one another and relative to the size of the respective surfaces of the other flux guide, in such a way that the first interference flux component generated by the magnetic interference field and concentrated and the second interference flux component generated by the magnetic interference field and concentrated are oriented preferably in opposite directions, and are in particular of equal value or have the same strength, that is to say are of the same magnitude, in the gap between the transmission surfaces.

At least one second collection surface can in each case be formed here integrally with the associated flux guide, in particular in one piece, or else can be formed as a separate component and only magnetically conductively with the associated flux guide. If the second collection surface is formed as a separate component, it is or has been preferably pre-assembled with the two flux guides and the second housing part to form the second assembly.

For further details regarding possible configurations of the flux guides, reference is hereby made to EP 20192858.7.

In a particularly advantageous refinement of a torque sensor device according to the invention, the first stator body and the second stator body are arranged here spaced apart from one another in particular in an axial direction, and at least one flux guide is arranged at least partially in between in an axial direction.

In principle, however, it is also possible for at least one flux guide to be arranged outside the stator arrangement in an axial direction, that is to say along the center axis. The collection surfaces and the transmission surface(s) should however each be configured and arranged oriented such that the magnetic fluxes which are respectively concentrated by the collection surfaces and which are generated by a surrounding magnetic interference field are at least partially, preferably almost completely, or completely, canceled out in accordance with the invention.

In an advantageous refinement of a torque sensor device according to the invention, the torque sensor device in particular also has a control device which is configured to determine a torque applied to a shaft, which is functionally connected to the torque sensor device, in a manner in a manner dependent on the magnetic flux detected by means of the magnetic sensor arrangement, and/or in a manner dependent on a sensor signal that is generated in a manner dependent on the detected magnetic flux.

In a further possible, particularly advantageous refinement of a torque sensor device according to the invention, the torque sensor device is assembled by a method according to the invention.

A method according to the invention for at least partially assembling a torque sensor device for detecting a torque applied to a shaft about an axis of rotation of the shaft, in particular for at least partially assembling a torque sensor device for detecting a torque applied to a steering shaft of a motor vehicle, wherein the torque sensor device has a magnetic arrangement, a stator arrangement, a flux guide arrangement and a magnetic sensor arrangement comprising at least one magnetic sensor, wherein the magnetic arrangement is configured to generate at least one magnetic field, wherein the flux guide arrangement has at least one first flux guide and a second flux guide and the first flux guide and the second flux guide each have at least one transmission surface, and wherein the torque sensor device furthermore has a first housing part and a second housing part, is characterized by the steps of:

a) pre-assembling a first assembly, which comprises at least the first housing part and the stator arrangement, and at least one magnetic sensor of the magnetic sensor arrangement, b) pre-assembling a second assembly, which comprises at least the second housing part and the first flux guide and the second flux guide, wherein the first flux guide and the second flux guide are connected to the second housing part in such a way that the at least one transmission surface of the first flux guide and the at least one transmission surface of the second flux guide lie opposite one another in such a way that they form an axial gap between them in which at least one magnetic sensor of the magnetic sensor arrangement can be arranged, c) assembling the first pre-assembled assembly and the second pre-assembled assembly, wherein the at least one magnetic sensor of the magnetic sensor arrangement is introduced into the gap between the transmission surfaces of the first flux guide and the second flux guide in such a way that a magnetic flux generated in the stator arrangement is detectable by means of the magnetic sensor, and d) fixing the two pre-assembled assemblies in their position relative to each other.

By means of a method according to the invention, a particularly simple assembling of a torque sensor device can be achieved, in particular a precise arrangement of the flux guide arrangement relative to the magnetic sensor arrangement can be achieved particularly simply. This is because simple positioning and alignment of the flux guide arrangement relative to the magnetic sensor arrangement can be achieved particularly easily and advantageously via the first housing part, which is part of the first pre-assembled assembly, and via the second housing part, which is part of the second pre-assembled assembly.

The pre-assembly of the magnetic sensor arrangement together with a first housing part and the stator arrangement to form a first pre-assembled assembly in step a), but separately and independently of the flux guide arrangement, which according to a method according to the invention is pre-assembled with a second housing part to form a second assembly, and provided that the flux guide arrangement is appropriately configured, especially for a flux guide arrangement with flux guides, as are known, for example, from WO 2020/174170 A1, WO 2020/174171 A1 or EP 20192858.7, in particular also in the case of flux guides with an additional collection surface, in particular with two collection surfaces each, as is known from EP 20192858.7, permits simple and precise installation of the torque sensor device and permits this to be undertaken in particular also with little risk of damage to the flux guide arrangement.

By pre-assembling the two flux guides or the flux guide arrangement with the second housing part, the risk of damage to the flux guides or to the flux guide arrangement, for example by bending the flux guides during installation, can furthermore be reduced. This can be reduced even further the more the flux guides or the flux guide arrangement are/is enclosed by the second housing part after the pre-assembly in step b) or the more the flux guides or the flux guide arrangement are/is surrounded by the second housing part after the pre-assembly.

When pre-assembling the first assembly in step a), the stator arrangement and/or the at least one magnetic sensor is/are preferably at least partially introduced, in particular inserted, into the first housing part, and connected to the first housing part and/or fastened thereto directly (i.e. without another component in between) or indirectly (with at least one component in between).

When pre-assembling the second assembly in step b), at least the first flux guide and the second flux guide, in particular the entire flux guide arrangement, are preferably at least partially introduced into the second housing part, and directly or indirectly connected to the second housing part and/or fastened thereto, in particular in such a way that they are at least partially accommodated by the second housing part.

In a particularly preferred embodiment of a method according to the invention, preferably in a further step, in particular during the final installation or the final assembly of the torque sensor device on a shaft, the torque of which is intended to be detected, the magnetic arrangement with the magnetic element or an assembly comprising the magnetic arrangement, is assembled with the remaining components. Particularly preferred, in a further step, at least the magnetic arrangement is assembled with the magnetic element with an assembly which has been assembled at least from the first pre-assembled assembly and the second pre-assembled assembly, in particular according to a method according to the invention.

Preferably, the magnetic arrangement, in particular the at least one magnetic element, is arranged here in such a way and positioned relative to the stator arrangement in such a way that the magnetic arrangement and the stator arrangement are movable relative to each other, as a result of a torque being applied, in the circumferential direction about a center axis of the torque sensor device in such a way that a magnetic flux can be generated in the stator arrangement by a relative movement between the magnetic arrangement and the stator arrangement in the circumferential direction, which magnetic flux can be detected in particular by means of at least one magnetic sensor introduced into the gap between the transmission surfaces of the first flux guide and the second flux guide.

Preferably, the magnetic arrangement is positioned in particular concentrically with respect to the stator arrangement and is introduced into the stator arrangement in particular concentrically with respect to the center axis. Preferably, the magnetic arrangement is arranged here with the magnetic element in particular within the stators, preferably radially within the stator tabs.

If the flux guide arrangement of the torque sensor device which is to be at least partially or completely assembled comprises further components, for example additional collection surfaces, which are preferably to be coupled magnetically conductively in particular to the first flux guide and/or to the second flux guide, said collection surfaces, also in step b), are particularly preferably pre-assembled together with the first flux guide and the second flux guide and the first housing part, wherein these components can likewise be connected to the second housing part, in particular can be fastened thereto, and/or to the first flux guide and/or to the second flux guide. If the additional components are fastened only to the first flux guide and/or only to the second flux guide, they can be fastened both before the connection of the flux guides to the second housing part and also after this. In many cases, however, it is more advantageous if the entire flux guide arrangement is first of all pre-assembled and is then assembled as a pre-assembled assembly with the second housing part in step b) to form the second assembly.

Steps a) and b), i.e. the pre-assembly of the first assembly and the second assembly, do not have to be carried out successively here. They may also be carried out at least partially or completely in parallel. Step b) may likewise be carried out prior to step a). It is merely of importance that steps a) and b) are completed before step c).

The axial gap which, after the pre-assembly of the second assembly, exists between the at least one transmission surface of the first flux guide and the at least one transmission surface of the second flux guide, is in particular an air gap, which is preferably dimensioned in such a way that the components to be arranged in each case in the gap can be placed in the gap and the magnetic flux concentrated in the flux guide arrangement can be transmitted with sufficient quality to the magnetic sensor arranged in the gap after the assembly of the torque sensor device.

In the context of this application, "assembling", in particular in the sense of step c), is understood within the scope of this application as meaning only mechanical assembling, in particular mechanical arranging, of the respective components with respect to one another. Further steps may be necessary, such as making electronic or electrical connections or the like, in order to set the torque sensor device into a functional state. In particular, for example, the production of one or more plug-in connections or one or more electrical contact connections may additionally be required.

The fixing of the first pre-assembled assembly and the fixing of the second pre-assembled assembly relative to each other in step d) is preferably carried out in particular by producing a latching connection, in particular by connecting the first housing part to the second housing part by latching, wherein for this purpose preferably at least one of the housing parts has at least one latching projection and the other housing part has at least one latching arm with a latching hook, wherein the latching hook can engage behind the latching projection. However, the two housing parts may also be connected to each other by screwing or adhesive bonding or in another way and may thereby be fixed relative to each other, with in particular the second assembly being fixed in its target position.

In a possible, in particular advantageous refinement of a method according to the invention, the pre-assembling of the second assembly in step b) is carried out by first of all the second housing part and at least the first flux guide and the second flux guide, in particular the entire flux guide arrangement, being provided, and then the first flux guide and the second flux guide, in particular the entire flux guide arrangement, being inserted into the second housing part and being connected thereto, in particular being fastened thereto, for example by latching, clipping-in, and/or calking and/or at least partially overmolding the flux guides or the flux guide arrangement.

This allows a particularly simple pre-assembly of the second assembly, in particular simple and good positioning of the flux guides relative to one another and of the flux guides or the flux guide arrangement relative to the second housing part, to be achieved. Particularly preferably, the second housing part is correspondingly configured and designed for receiving the flux guides or the flux guide arrangement and has in particular special positioning aids and/or alignment aids, for example, corresponding stop surfaces, recesses or the like, which are designed to interact with the flux guides or the flux guide arrangement, which particularly preferably also have/has corresponding stop surfaces, projections or the like as positioning aids.

For connection to the second housing part, the second housing part and/or the first flux guide and/or the second flux guide or the flux guide arrangement preferably furthermore have/has corresponding fastening means, in particular, for example, latching elements, such as one or more latching projections, latching lugs, latching hooks, latching arms, clips, or the like. If a fastening is provided by at least partial overmolding of the flux guides or the flux guide arrangement, it is advantageous if these have for this purpose in particular special overmolding tabs or the like, in particular doubly angled overmolding tabs. Such tabs can provide a particularly good and fixed connection to the second housing part.

Alternatively, the pre-assembly of the second assembly in step b) can also be carried out, for example, by first of all providing at least the first flux guide and the second flux guide, in particular the entire flux guide arrangement, in particular in a molding die for producing the second housing part, and then, in particular in an immediately following step, the second housing part is produced by the injection molding method, wherein at least the first flux guide and the second flux guide, in particular the entire flux guide arrangement, are at least partially overmolded in such a way that they are fixedly connected to the second housing part.

In a further possible, in particular advantageous refinement of a method according to the invention, the assembling in step c) is carried out in particular by, in a first step c1), the first pre-assembled assembly and the second pre-assembled assembly being brought into contact with each other in an engagement position, wherein the two assemblies are in particular brought into engagement with each other, and, in a further, in particular subsequent, step c2), the second pre-assembled assembly being displaced in a plane extending perpendicular to the center axis of the torque sensor device in the tangential direction relative to the first assembly as far as a target position. Thus, a particularly simple arrangement of the second pre-assembled assembly with respect to the first pre-assembled assembly can be achieved, in particular if the transmission surfaces of the two flux guides extend in each case parallel to a plane which is perpendicular to the center axis and in which the displacement direction runs. Thus, it is also possible with flux guides which have collection surfaces parallel to the transmission surfaces, also with flux guides with first and second collection surfaces, with which compensation of an interference flux component can be achieved, such as, for example, in principle described in terms of function in WO 2020/174170 A1, WO 2020/174171 A1 or EP 20192858.7, to achieve particularly simple installation of the torque sensor device, in particular if all the collection surfaces extend parallel to the transmission surfaces and all the connecting portions between the transmission surfaces and the collection surfaces do not intersect the displacement direction, but rather always extend only parallel to the displacement direction. In particular, particularly simple introduction of the at least one magnetic sensor into the axial gap between the transmission surfaces can thereby be achieved, in particular in the tangential direction.

It has proven to be particularly advantageous if, during the assembling in step c), the second pre-assembled assembly, in particular the second housing part, is pushed onto the first pre-assembled assembly, in particular the first housing part, in particular in the tangential direction. This permits a particularly simple configuration of the two housing parts and a particularly compact and thus space-saving configuration of the torque sensor device.

For particularly simple installation, in particular if a reduction in the influence of the interfering flux or compensation for an interfering flux is desired, the first flux guide and the second flux guide are therefore preferably designed in such a way and configured to be arranged in such a way that all the collection surfaces extend parallel to the transmission surfaces and all the connecting portions between the transmission surfaces and the collection surfaces do not intersect the displacement direction, but rather always extend only parallel to the displacement direction.

In a further possible, in particular advantageous refinement of a method according to the invention, the second housing part is at least partially open at least on a bottom side and on one side, wherein, during the pre-assembly in step b), at least the first flux guide and/or the second flux guide, in particular the entire flux guide arrangement, are/is introduced, in particular inserted, from the open bottom side or from the open side into the second housing part. This permits a particularly simple configuration of the second housing part and particularly simple pre-assembly of the second assembly.

In a development of a method according to the invention, in step c1), the second pre-assembled assembly is aligned here in such a way that, in the engagement position of the second pre-assembled assembly, the open side of the second housing part extends at least substantially orthogonally to the displacement direction, and, in step c2), during the displacement in the tangential direction, the second pre-assembled assembly is displaced in particular with the open side in front from the engagement position into the target position. This permits a particularly simple configuration of the two housing parts and particularly simple assembling of the two assemblies in step c), wherein, for this purpose, the second pre-assembled assembly is arranged and aligned in step c1) in a particularly preferred manner relative to the first pre-assembled assembly such that the open bottom side of the second housing part faces the first pre-assembled assembly, and therefore it can be displaced parallel to the center axis, and the open side extends at least substantially orthogonally to the displacement direction, i.e. in a plane perpendicular to the displacement direction.

Alternatively, in a further possible, likewise advantageous refinement of a method according to the invention, the assembling in step c) can also be carried out by, in a first step c1), the first pre-assembled assembly and the second pre-assembled assembly being brought into contact with each other in an engagement position, in particular into engagement with each other, and, in a further, in particular subsequent, step c2), the second pre-assembled assembly being displaced in a plane extending perpendicular to the center axis of the torque sensor device in the radial direction relative to the first assembly as far as a target position.

Thus, a particularly simple arrangement of the second pre-assembled assembly with respect to the first pre-assembled assembly can likewise be achieved, in particular if the transmission surfaces of the two flux guides extend in each case parallel to a plane which is perpendicular to the center axis and in which the displacement direction runs. Similarly, by this means, with flux guides which have a collection surface parallel to the transmission surfaces, particularly simple installation of the torque sensor device can be achieved, in particular if all the collection surfaces extend parallel to the transmission surfaces and all the connecting portions between the transmission surfaces and the collection surfaces do not intersect the displacement direction. In particular, particularly simple introduction of the at least one magnetic sensor into the axial gap between the transmission surfaces can thereby be achieved, in particular in the radial direction.

It has alternatively proven to be particularly advantageous if, during the assembling in step c), the second pre-assembled assembly, in particular the second housing part, is pushed at least partially into the first pre-assembled assembly, in particular the first housing part, in particular in the radial direction. This permits a particularly simple configuration of the two housing parts and a particularly compact and thus space-saving configuration of the torque sensor device.

In a further possible, in particular advantageous refinement of a method according to the invention, the second housing part is partially open at least on a bottom side, wherein, during the pre-assembling in step b), at least the first flux guide and/or the second flux guide, in particular the entire flux guide arrangement, are/is introduced, in particular inserted, from the open bottom side into the second housing part. This permits a particularly simple configuration of the second housing part and particularly simple pre-assembly of the second assembly.

In an alternative development of a method according to the invention, in step c1), the second pre-assembled assembly is aligned in particular in such a way that, in the engagement position of the second pre-assembled assembly, the open bottom side extends at least substantially orthogonally to the displacement direction, and, in step c2), during the displacement in the radial direction, the second pre-assembled assembly is displaced in particular with the open bottom side in front from the engagement position into the target position. This likewise permits a particularly simple configuration of the two housing parts and particularly simple assembling of the two assemblies in step c), wherein, for this purpose, the second pre-assembled assembly is arranged and aligned in step c1) in a particularly preferred manner relative to the first pre-assembled assembly in particular such that the open bottom side of the second housing part faces the first pre-assembled assembly, and therefore it can be displaced in a plane perpendicular to the center axis, and the open side extends at least substantially orthogonally to the displacement direction, i.e. in a plane perpendicular to the displacement direction.

Preferably, the second assembly is guided, in particular mechanically, during the displacement here in each case by means of guide elements on the first assembly, in particular by means of guide elements of the first housing part, which interact with corresponding guide elements on the second assembly, in particular on the second housing part. Thus, the risk of damage to the flux guides or the flux guide arrangement can be reduced in a particularly simple manner and, furthermore, precise positioning of the two assemblies with respect to each other, and therefore at least of the flux guides relative to at least one magnetic sensor of the magnetic sensor arrangement, can also be reliably achieved in a simple manner.

In a further possible, in particular advantageous refinement of a method according to the invention, the magnetic sensor arrangement furthermore comprises a printed circuit board, wherein at least one magnetic sensor is fastened to the printed circuit board, wherein the printed circuit board has a cutout, in particular a slotted recess or a through opening or the like, or a region of reduced thickness compared to a surrounding region, wherein the at least one magnetic sensor fastened to the printed circuit board is arranged in the region of the cutout or in the region of reduced thickness, and wherein the assembling of the first pre-assembled assembly and of the second pre-assembled assembly in step c) is carried out in such a way that, after the at least one magnetic sensor of the magnetic sensor arrangement is introduced into the gap between the transmission surfaces of the first flux guide and the second flux guide, the cutout or the region of reduced thickness of the printed circuit board is likewise located in the gap between the transmission surfaces of the two flux guides. A distance between the two opposite transmission surfaces or a gap width in the axial direction can be reduced, in particular minimized, in a simple manner, by means of such a printed circuit board, which in particular has an advantageous effect on the construction height of the torque sensor device in the axial direction in the region of the magnetic sensor.

All of the features and embodiments described in connection with a torque sensor device according to the invention and the respective advantages thereof also apply correspondingly in each case to a method according to the invention and vice versa where technically possible or feasible, even if these have been described explicitly or implicitly in each case only once in conjunction with only one of the abovementioned subjects of the invention.

Further features of the invention can be found in the claims, the figures, and the description of the figures. All of the features and combinations of features that are mentioned in the description above, and also the features and combinations of features that are in each case illustrated visibly below in the figures and/or mentioned in the description of the figures, may be implemented not only in the respectively specified combination but also in other combinations (of features) or else also on their own, i.e. in isolation from the other features of the combination described herein, in a torque sensor device according to the invention and/or in a method according to the invention can be implemented, provided that this combination or the corresponding use on their own is technically possible and feasible.

BRIEF DESCRIPTION OF DRAWINGS

The invention will now be discussed in more detail on the basis of several preferred exemplary embodiments, which should be understood as being non-restrictive, with reference to the appended drawings, with functionally identical components being denoted by the same reference signs. In the drawings, in each case schematically.

DETAILED DESCRIPTION

Figure 1:
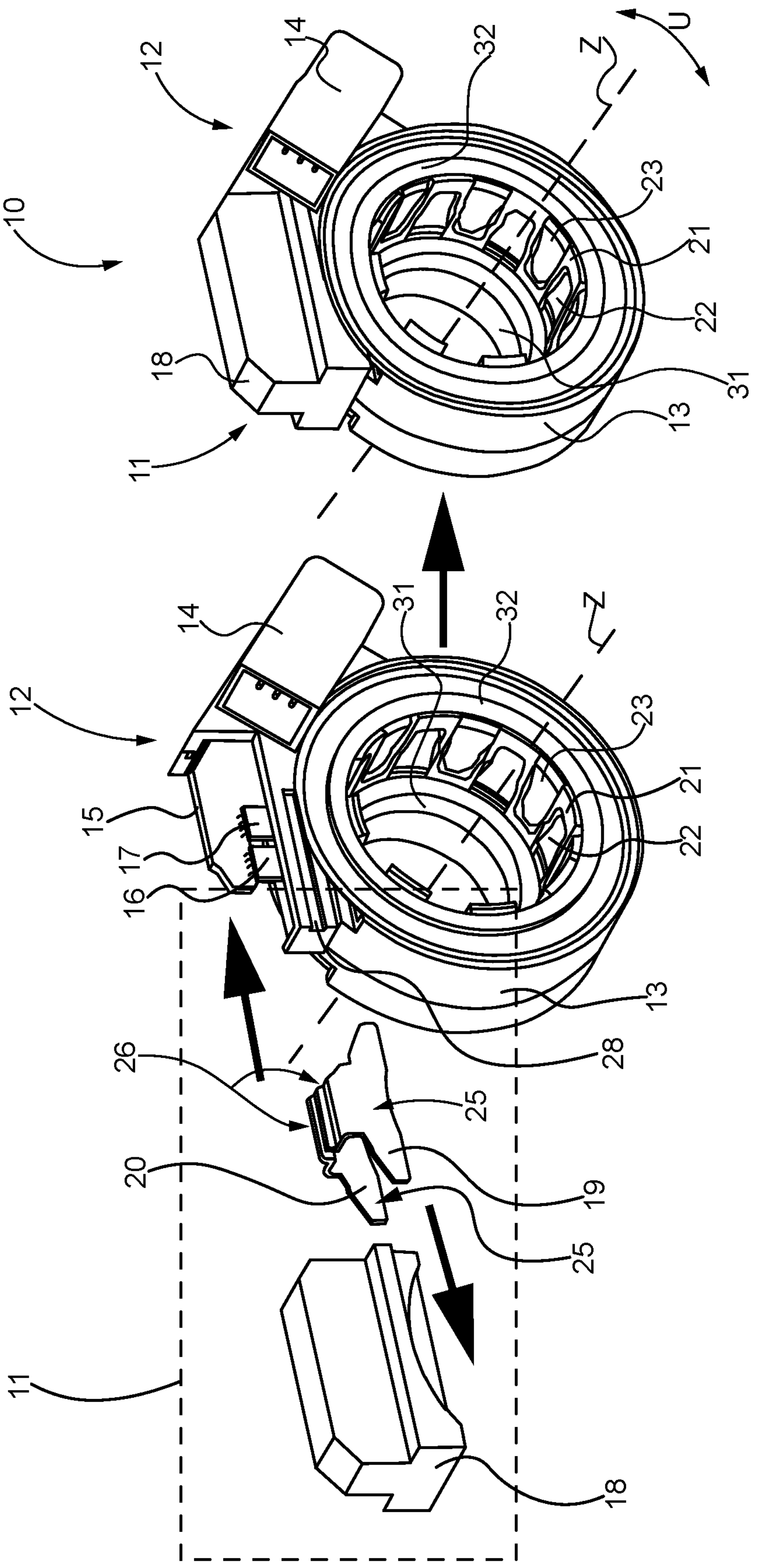
FIG. 1 shows parts of a first exemplary embodiment of a torque sensor device according to the invention in various installation states in a partially exploded illustration.

FIG. 1 shows parts of a first exemplary embodiment of a torque sensor device 10 according to the invention in various installation states in a partially exploded illustration, but without an associated magnetic arrangement, i.e. without an associated magnetic element 33 (see FIG. 5), wherein the torque sensor device 10 is configured to detect a torque applied to a steering shaft of a motor vehicle and has a stator arrangement with a stator holder 21 and with a first stator 22 and a second stator 23, each with an annular-disk-shaped stator body, not denoted specifically here, and stator tabs, likewise not denoted specifically.

The stator tabs of the two stators 22 and 23, which are held by means of the stator holder 21 and onto which they are pushed in particular in the axial direction, engage in one another in a manner similar to a toothing here. By means of a fastening ring 32, the stators 22 and 23 are axially fixed at least in one direction. Therefore, the fixing ring 32 may also be referred to as a fixing ring 32. For the non-rotatable connection of the stator arrangement to a first part of a shaft, not shown here, the stator holder 21 furthermore has a fastening sleeve 31 or a sleeve-shaped fastening section, which can be pushed onto the associated shaft section and fastened thereto, for example by shrinking it on by means of a press fit.

Figure 5:
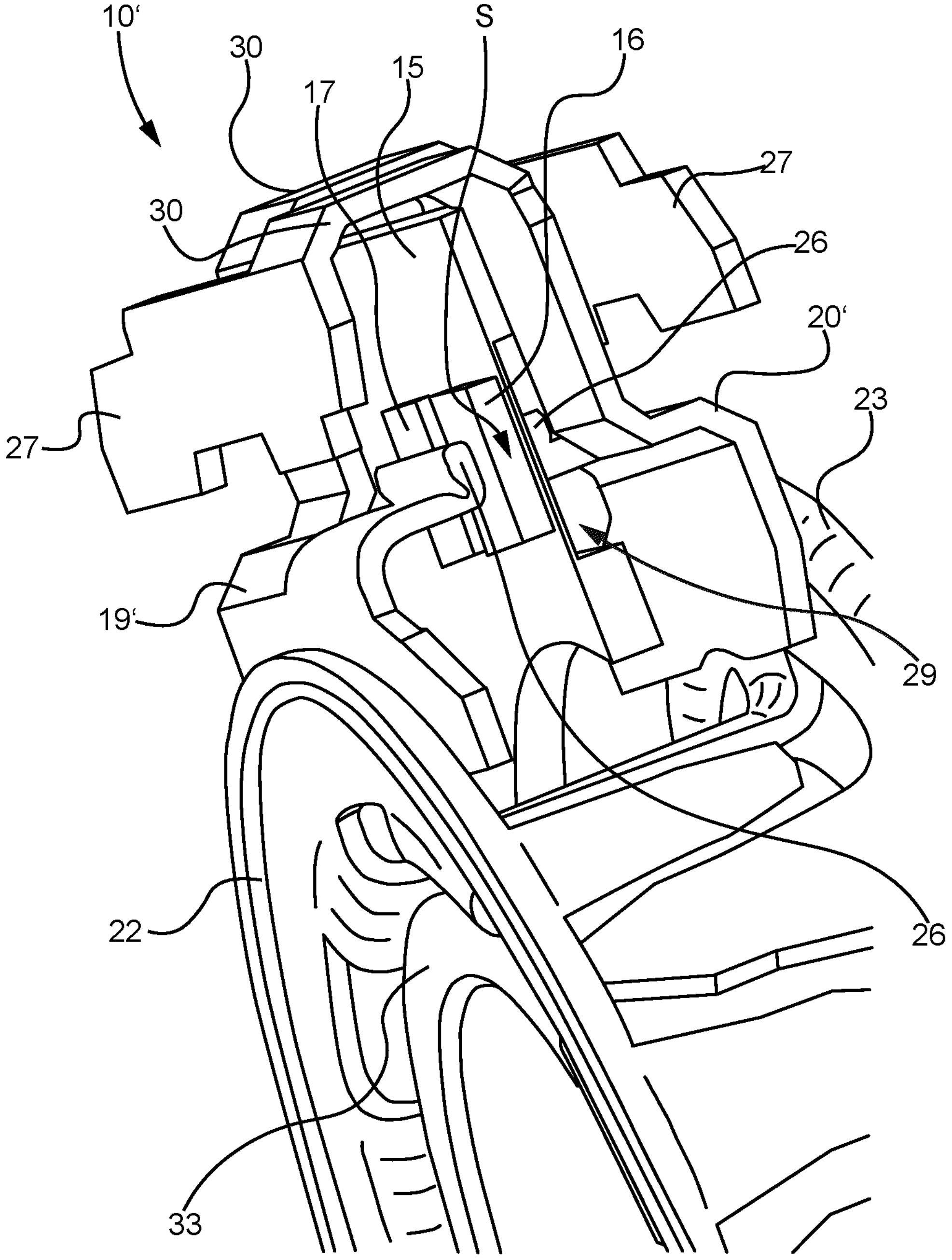
FIG. 5 shows a detail of the torque sensor arrangement from FIG. 2 in a perspective, enlarged illustration in another view, without the two housing parts, but with the magnetic element.

For the generation of a magnetic flux, a magnetic arrangement with a magnetic element 33, as shown by way of example in FIG. 5, can be arranged in the interior of the stator arrangement concentrically with respect to the stator arrangement or to the center axis Z in this torque sensor device 10, as is known in principle from the prior art, wherein the magnetic arrangement is not shown except in FIG. 5 for the benefit of better visibility of the stator arrangement.

For generating at least one magnetic working field, the magnetic arrangement 33 can have, in particular, as in the example in FIG. 5, a magnetic element 33 in the form of an annular permanent magnet, which is or can be arranged concentrically with respect to a center axis Z and to the stator arrangement and can be fastened to a first part of a steering shaft, not shown here, for rotation therewith, while the stator arrangement, as already mentioned at the beginning, can be connected via the fastening sleeve 32 to a second part of the steering shaft for rotation therewith, and therefore the stator arrangement is rotatable in the circumferential direction U relative to the magnetic element 33 about the center axis Z, which coincides in a functional state of use of the torque sensor device 10 in particular with an axis of rotation of the steering shaft, as a result of which a magnetic flux can be generated in the stator arrangement, in particular in the two stators 22 and 23. Depending on the magnetic flux generated in this way, the torque applied to the steering shaft can be determined by means of the magnetic sensor arrangement and a control device, not shown specifically here.

Furthermore, the torque sensor device 10 has, according to the invention, a flux guide arrangement with a first flux guide 19 and a second flux guide 20, and with a magnetic sensor arrangement having a printed circuit board 15 and two magnetic sensors 16 and 17. The flux guide arrangement with the two flux guides 19 and 20 is designed here for at least partially concentrating and for conducting the magnetic flux generated in the stator arrangement to the two magnetic sensors 16 and 17, wherein the magnetic sensors 16 and 17 are each in turn designed for generating a corresponding sensor signal for further evaluation, from which sensor signal the torque can be determined.

In this exemplary embodiment of a torque transmission device 10 according to the invention, each of the flux guides 19 and 20 has in each case a collection surface 25 and in each case a transmission surface 26, wherein the magnetic flux generated in the stator arrangement is concentrated via the collection surfaces 25 in each case and transmitted via the transmission surfaces 26 to the magnetic sensors 16 and 17 in each case, which, in an assembled state of the torque sensor device 10, are in each case arranged parallel to the transmission surfaces 26 in the axial gap S (cf. FIG. 5) between the transmission surfaces 26.

Furthermore, the torque sensor device 10 according to the invention has a first housing part 13, by which the stator arrangement and the magnetic sensor arrangement are accommodated, and which comprises a plug receptacle 14 for producing a data and signal connection to an associated control device, not shown here, and for the power supply. According to the invention, the first housing part 13 is pre-assembled here with the magnetic sensor arrangement with the printed circuit board 15 and the two magnetic sensors 16 and 17 as well as with the stator arrangement with the stator holder 21, the stators 22 and 23 and, in this case, the fixing ring 32 to form a first assembly 12.

In the example shown in FIG. 1, the first housing part 13 is formed in two parts and is assembled in particular from two halves having a separating plane extending perpendicular to the center axis Z. This permits particularly simple pre-assembly of the first assembly 12, wherein the two halves of the first housing part 13 can be assembled in particular in the axial direction and can be latched together, as a result of which the remaining components of the first pre-assembled assembly 12 (the stator arrangement with the stator holder 21 with the fastening portion 31, the stators 22 and 23 with the stator tabs, the fixing ring 32 and the magnetic sensor arrangement with the printed circuit board 15 and the magnetic sensors 16 and 17) can be held in a simple manner in the first housing part 13 and fixed relative to one another.

Furthermore, the torque sensor device 10 has a second housing part 18, which is designed to receive the flux guide arrangement with the two flux guides 19 and 20, in order to form a second pre-assembled assembly 11 therewith, which is to be symbolized by the dashed rectangle in FIG. 1.

In this exemplary embodiment, the second housing part 18 is designed here as a single piece, i.e. is composed of a single component rather than a plurality of parts, but is open on its bottom side and on one side (here on the right side) such that the flux guides 19 and 20, in particular the entire flux guide arrangement, can be pushed into the second housing part 18 (from right to left with reference to the illustration in FIG. 1), as within the dashed rectangle in FIG. 1 by the arrow from the side in the direction of the arrow. The flux guides 19 and 20 can be inserted in particular into the second housing part 18 and latched therein and in this way can be fixedly connected to the second housing part 18 and secured against dropping out.

Alternatively, one or more flux guides can also be fastened, for example, by calking, casting and/or adhesive bonding or the like in or on the second housing part 18.

The two housing parts 18 and 13 are preferably formed from plastic, and particularly preferably produced by the injection molding method, wherein, as an alternative to the embodiment described here or the possible embodiment shown in FIG. 1, the second housing part 18 can also (only) be produced with an at least partial overmolding of the flux guide arrangement, while at the same time, by the at least partial overmolding of the flux guide arrangement, the flux guide arrangement, in particular at least the first flux guide 19 and the second flux guide 20 at least, can be partially overmolded and thus fixedly connected to the second housing part 18.

In this exemplary embodiment of a torque sensor device 10 according to the invention, the second housing part 18 can be pushed here in the tangential direction onto the first housing part 13, wherein, during the pushing on, the two magnetic sensors 16 and 17 are introduced into the gap S (see FIG. 4) between the transmission surfaces 26 of the first flux guide 19 and the second flux guide 20 in such a way that, in an at least partially functionally assembled state of the torque sensor device 10, in particular in a functionally assembled state of the first pre-assembled assembly 12 and the second pre-assembled assembly 11, as is shown on the far right in FIG. 1, in principle a magnetic flux generated in the stator arrangement can be detected by means of the magnetic sensors 16 and 17.

The two magnetic sensors 16 and 17 are each arranged here on a printed circuit board 15 extending perpendicularly to the center axis Z, wherein, in the region of the magnetic sensors 16 and 17, the printed circuit board 15 in each case has a cutout 29 which is slotted in a U-shaped manner and in which in each case one of the transmission surfaces 26 of one of the two flux guides 19 and 20, in this example the transmission surface 26 of the flux guide 20, can be arranged in a plane with the printed circuit board plane, as a result of which a particularly compact torque sensor device 10 can be achieved in the axial direction in this region.

For damage-free installation and in particular for precise positioning of the flux guides 19 and 20 within the torque sensor device 10, in particular relative to the components thereof, in particular relative to the stator arrangement with the stators 22 and 23 and the magnetic sensors 16 and 17, in this exemplary embodiment the first housing part 13 is provided with corresponding U-shaped guide grooves 28 extending in the tangential direction in this case, in each case on the outside in the displacement direction, in which correspondingly designed guide rails or guide projections or guide pins, which are not visibly seen here and which are arranged in the interior of the second housing part 18, can engage, by means of which, when they are brought into contact or into engagement, the desired alignment of the two pre-assembled assemblies 11 and 12 with respect to each other can be achieved, as well as precise guidance during the pushing of the second pre-assembled assembly 11 onto the first assembly 12. As a result, the risk of damage to the flux guides 19 and 20, in particular of bending, can be reduced considerably in a simple way. The guide elements, which are not visibly seen, in the second housing part 18 preferably likewise extend here in the tangential direction and in particular to the same length as the guide groove. However, they may also be shorter.

If the second pre-assembled assembly 11 or the second housing part 18 is pushed onto the first housing part 13 or the first pre-assembled assembly 12 as far as a target position, as shown on the far right in FIG. 1, in which the first pre-assembled assembly 12 and the second pre-assembled assembly 11 are functionally assembled, the second housing part 18 or the second pre-assembled assembly 11 can be fixed in its position relative to the first pre-assembled assembly 12 or in particular to the first housing part 13.

The torque sensor device 10 shown in FIG. 1 can be at least partially, with further, in particular subsequent steps, in particular completely, assembled or installed by a method according to the invention, wherein, at least in a first step a), the first housing part 13 as well as the stator arrangement with the stator holder 21 and the stators 22 and 23 and the printed circuit board 15 with the magnetic sensors 16 and 17 are pre-assembled to form a first assembly 12, as shown in the middle of FIG. 1.

In a further step b), which may also be carried out before or simultaneously with step a), the two flux guides 19 and 20, which in this case form the flux guide arrangement of the torque sensor device 10, are pre-assembled with the second housing part 18 to form a second assembly.

Subsequently, in a third step c), the first pre-assembled assembly 11 and the second pre-assembled assembly 12 are assembled, wherein the two magnetic sensors 16 and 17 are inserted in each case here into the gap between the two transmission surfaces 26 of the two flux guides 19 and 20, in particular in such a way that a magnetic flux generated in the stator arrangement can be detected by means of the two magnetic sensors 16 and 17, which are each designed as Hall sensors.

Subsequently, the second pre-assembled assembly is fixed in its position, in a further step d), with the second housing part 18 relative to the first assembly 12, in particular by latching the second housing part 18 to the first housing part 13.

In this exemplary embodiment, the assembling of the two assemblies 11 and pre-assembled assemblies 11 and 12 in step c) is carried out here in such a way that the two assemblies 11 and 12 are first of all brought into engagement with each other, which is not shown here, before the second assembly 11 is then pushed by a tangential displacement in a plane extending perpendicular to the center axis Z onto the first assembly 12, in particular the housing part 13 thereof, and is fixed in its target position, as shown on the right in the image of FIG. 1. This enables particularly simple installation of a torque sensor device to be achieved.

Preferably, in a further step, in particular when fastening the stator arrangement on a shaft, the magnetic arrangement with the magnetic element 33 is arranged in a correspondingly relative and functional manner in the interior of the stators 22 and 23, in particular concentrically with respect to the center axis Z, such that, as a result of a torque being applied, the magnetic arrangement and the stator arrangement are movable relative to each other in the circumferential direction U about the center axis Z of the torque sensor device 10 in such a way that a magnetic flux can be generated in the stator arrangement by a relative movement between the magnetic arrangement 33 (see FIG. 5) and the stator arrangement in the circumferential direction U.

Figure 2:
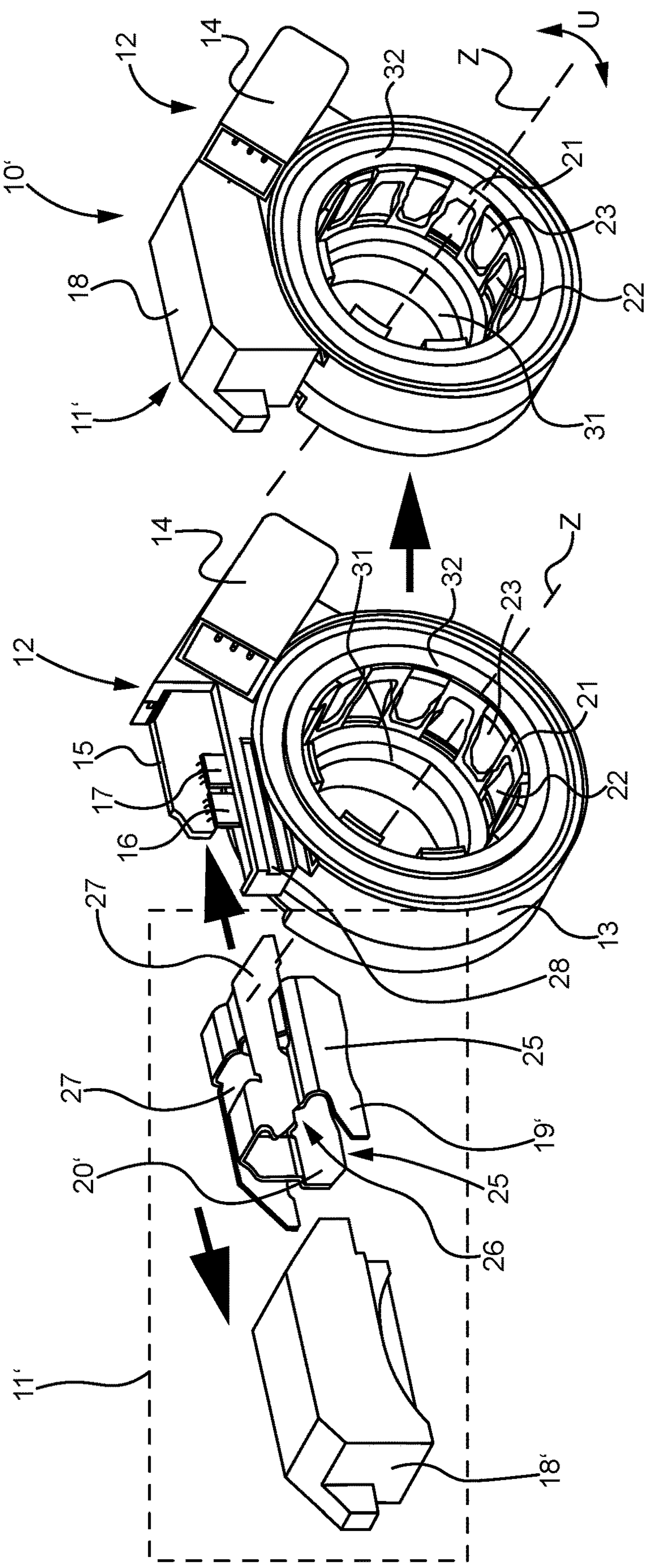
FIG. 2 shows parts of a second exemplary embodiment of a torque sensor device according to the invention in various installation states in a partially exploded illustration.

FIG. 2 shows parts of a second exemplary embodiment of a torque sensor device 10' according to the invention in various installation states in a partially exploded illustration, the flux guide arrangement being formed differently in this exemplary embodiment 10'. In this example, each of the two flux guides 19' and 20' has, in each case in addition to the first collection surface 25, in each case a second collection surface 27, which is arranged in each case in such a way, and is connected magnetically conductively to the associated transmission surface 26 of the respective flux guide 19' or 20' in each case via a connecting portion 30 (see FIG. 5) in such a way, that a magnetic interference flux concentrated in the respectively other flux guide 20' or 19' is at least partially canceled out in the axial gap. For a more detailed description of this effect, reference is made to EP 20192858.7. Thus, in a particularly simple manner, a reduction in the interference influence of a magnetic interference magnetic field in the surroundings of the torque sensor device 10' can be reduced or even completely avoided in the corresponding configuration.

Except for the other flux guide arrangement, the torque sensor device 10' according to the invention that is shown in FIG. 2 is substantially similar to the torque sensor device 10 from FIG. 1 and can also be assembled by a method according to the invention, wherein, for this purpose, the two flux guides 19' and 20' can likewise first of all be introduced from the side into the second housing part 18' and latched therein and can then be pushed together with the latter as a second pre-assembled assembly 11 in the tangential direction perpendicular to the center axis Z onto the first housing part 13 or the first pre-assembled assembly 12, which is identical to the pre-assembled assembly 12 from FIG. 1, such that the magnetic sensors 16 and 17 are introduced into the gap between the transmission surfaces 26 of the two flux guides 19' and 20'. Here, too, damage-free and accurate positioning of the flux guides 19' and 20' can be achieved by means of the guide grooves 28 and corresponding guide elements, likewise not visibly seen here, in the interior of the second housing part 18'.

Figure 3:
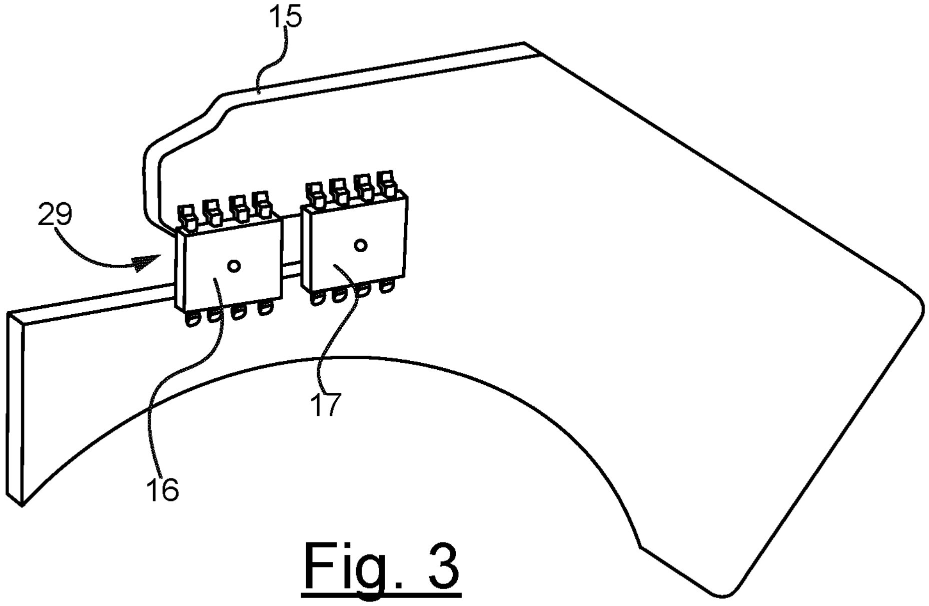
FIG. 3 shows the printed circuit board of the torque sensor device from FIGS. 1 and 2 with the two magnetic sensors fastened thereto in a perspective illustration looking at a first side of the printed circuit board.

FIG. 3 shows, for better understanding, the printed circuit board 15 of the torque sensor device from FIGS. 1 and 2 with the two magnetic sensors 16, 17 fastened thereto in a perspective illustration looking at a first side of the printed circuit board 15, wherein, on the basis of this illustration, the slot 29 in the printed circuit board 15 and the manner in which the magnetic sensors 16 and 17 are fastened on the printed circuit board 15 can be seen particularly readily. In this case, in particular in order to be able to achieve a particularly low axial construction height, the two magnetic sensors 16 and 17 are designed here as what are referred to as SMD components, wherein the printed circuit board is a standard PCB, i.e. a standard printed circuit board 15.

Figure 4:
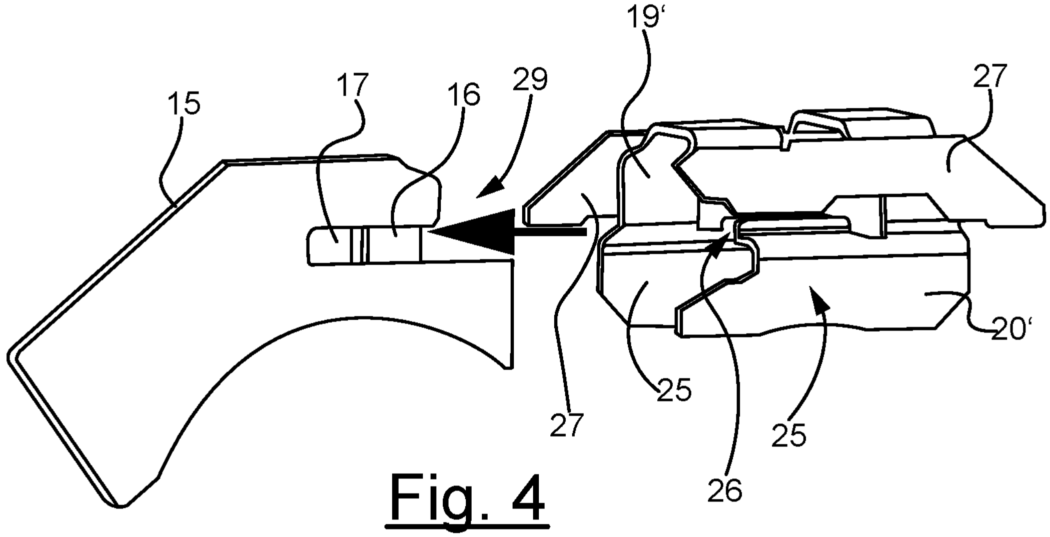
FIG. 4 shows the printed circuit board from FIG. 3 looking at the other side of the printed circuit board and the two flux guides of the torque sensor arrangement from FIG. 2, which form the flux guide arrangement of the torque sensor device from FIG. 2.

FIG. 4 shows the printed circuit board 15 from FIG. 3 looking at the other side of the printed circuit board 15 and the two flux guides 19' and 20' of the torque sensor arrangement 10' from FIG. 2, which form the flux guide arrangement of the torque sensor device 10' from FIG. 2, wherein, in this view, the two transmission surfaces 26 can be readily seen.

FIG. 5 shows the torque sensor arrangement 10' from FIG. 2 in a perspective illustration, but without the two housing parts 13 and 18 but with a magnetic element 33 in the form of a permanent ring magnet 33 which is arranged concentrically in the interior of the stators 22 and 23, can be fastened on a second part of a shaft for rotation therewith and can be moved, in particular twisted, in the circumferential direction U relative to the stators or the stator arrangement. In this illustration, the arrangement of the individual components in the axial gap S can also be readily seen, in particular the arrangement of the magnetic sensors 16 and 17 in the gap between the transmission surfaces 26, and the arrangement of the transmission surface 26 of the flux guide 20' in the slotted cutout 29 of the printed circuit board 15 in a plane with the printed circuit board 15.

The U-shaped configuration of the two flux guides 19' and 20' can likewise be readily seen with their two respective collection surfaces 25 and 27, which are magnetically conductively connected to each other via a connecting portion 30 in each case, wherein the first collection surfaces 25 are furthermore each magnetically conductively connected to the transmission surfaces 26 magnetically conductively such that a flux concentrated in the flux guide can be transmitted (contactlessly) to the magnetic sensors 16 and 17.

Owing to the special interlocked arrangement of the transmission surfaces 26 and the collection surfaces 27, a interference flux compensation or a reduction in an interference flux influence and thus improved accuracy of the sensor device 10' can be achieved. For more information in this regard, in particular as to how this effect arises and how the flux guides 19' and 20' are preferably to be designed, reference is made to EP 20192858.7, which has already been mentioned several times.

Figure 6:
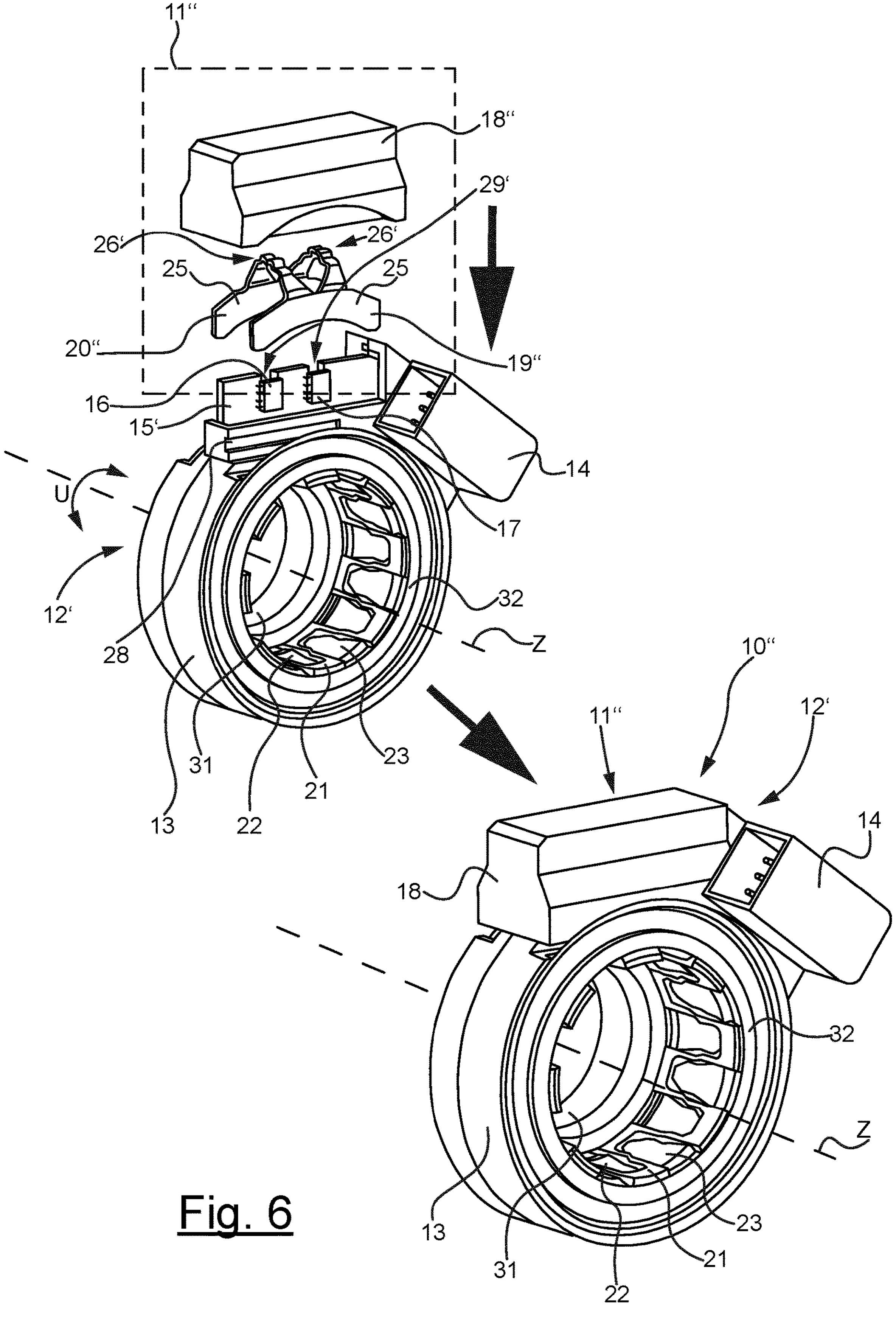
FIG. 6 shows parts of a third exemplary embodiment of a torque sensor device according to the invention in various installation states in a partially exploded illustration.

FIG. 6 shows parts of a third exemplary embodiment of a torque sensor device 10" according to the invention in different installation states in a partially exploded illustration, wherein this exemplary embodiment of a torque sensor device 10" according to the invention differs from the two previously described torque sensor devices 10 and 10' in that, in this case, the second housing part 18" is at least partially open only on a bottom side and, in this case, the flux guide arrangement with the two flux guides 19'" and 20" is inserted or plugged from below into the second housing part 18'", or the second housing part 18'" or the second pre-assembled assembly 11" is plugged onto the first pre-assembled assembly 12'. Here, too, the dashed rectangle is to symbolize the second pre-assembled assembly 11".

As in the exemplary embodiment in FIG. 1, this flux guide arrangement likewise in each case only has flux guides 19" and 20" each with a first collection surface 25 and not, as in the example in FIG. 2, with two collection surfaces 25 and 27 each.

A further difference in the case of the exemplary embodiment of a torque sensor device 10" according to the invention that is shown in FIG. 6 over the device from FIG. 1 is that the second pre-assembled assembly 11" is not pushed in the tangential direction onto the first pre-assembled assembly 12', but rather is plugged on in particular in the radial direction, which is indicated by the associated arrow.

So that the transmission surfaces 26 of the flux guides 19" and 20" can also form as optimum a gap as possible or can be positioned as optimally as possible in the axial direction outside the two magnetic sensors 16 and 17, especially as closely to them as possible, the printed circuit board 15' in this case has U-shaped slots 29' which are open in each case in the radial direction (see FIG. 9), in which the transmission surfaces 26' engage, wherein, in this case, two smaller, narrow transmission surfaces 26' are provided in each case instead of an elongate one as in the examples from FIGS. 1 and 2.

In this example, the guide groove 28 in the first housing part 13 does not serve for guidance during the radial displacement of the second assembly 11" relative to the first assembly 12', but rather in particular for fixing the second assembly 11'" in the target position, in particular for latching the second housing part 18'" in the target position on the first housing part 13.

Figure 7:
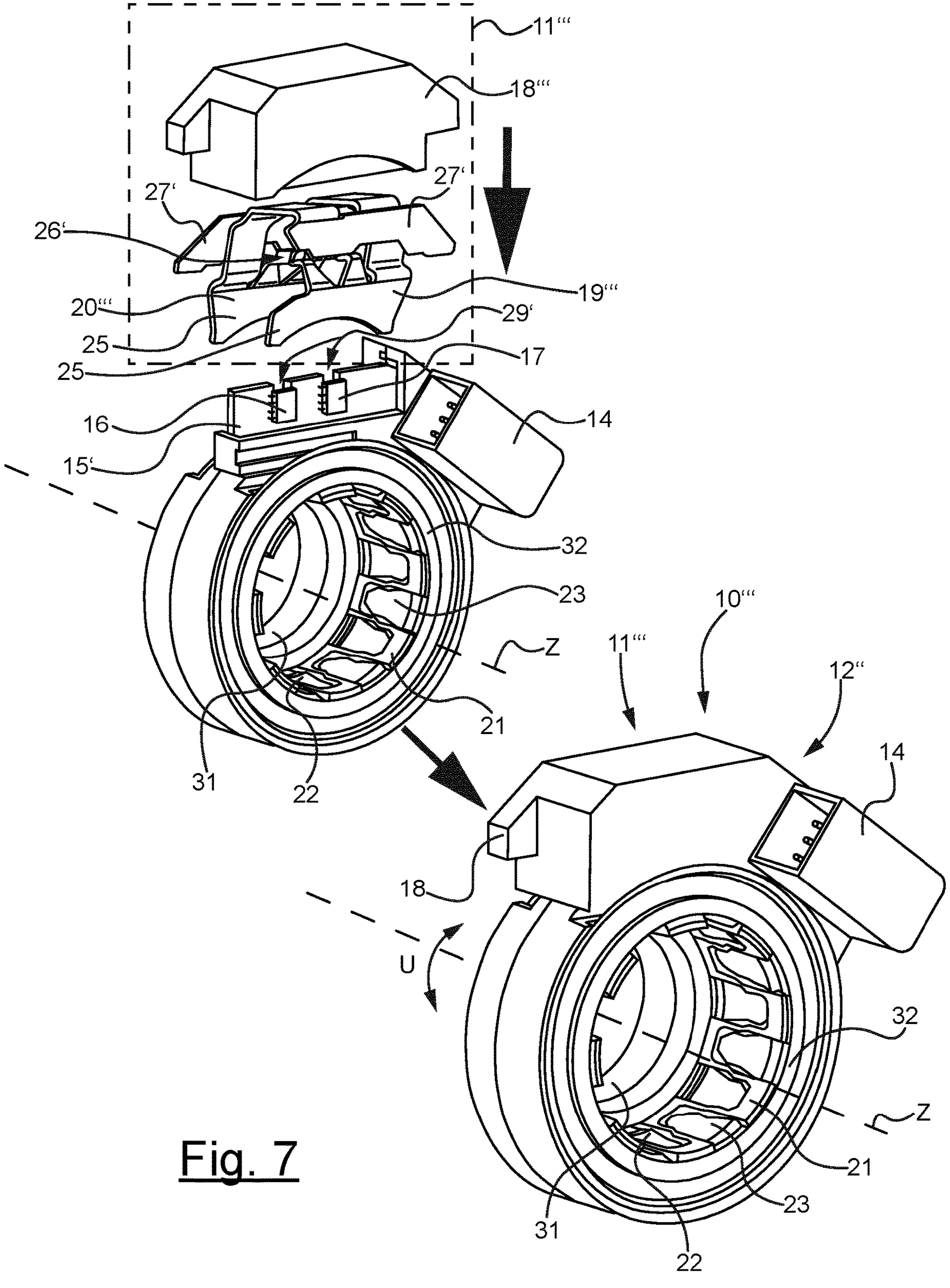
FIG. 7 shows parts of a fourth exemplary embodiment of a torque sensor device according to the invention in various installation states in a partially exploded illustration.

FIG. 7 shows parts of a fourth exemplary embodiment of a torque sensor device 10'" according to the invention in various installation states in a partially exploded illustration, wherein this torque sensor device 10" is designed substantially in the manner of the torque sensor device 10", but has a corresponding, radially installable second assembly 11'" which has two flux guides 19'" and 20'" which are curved in a U-shaped manner with in each case two collection surfaces 25 and 27' (see FIG. 9) analogously to the torque sensor device from FIG. 2.

Figure 8:
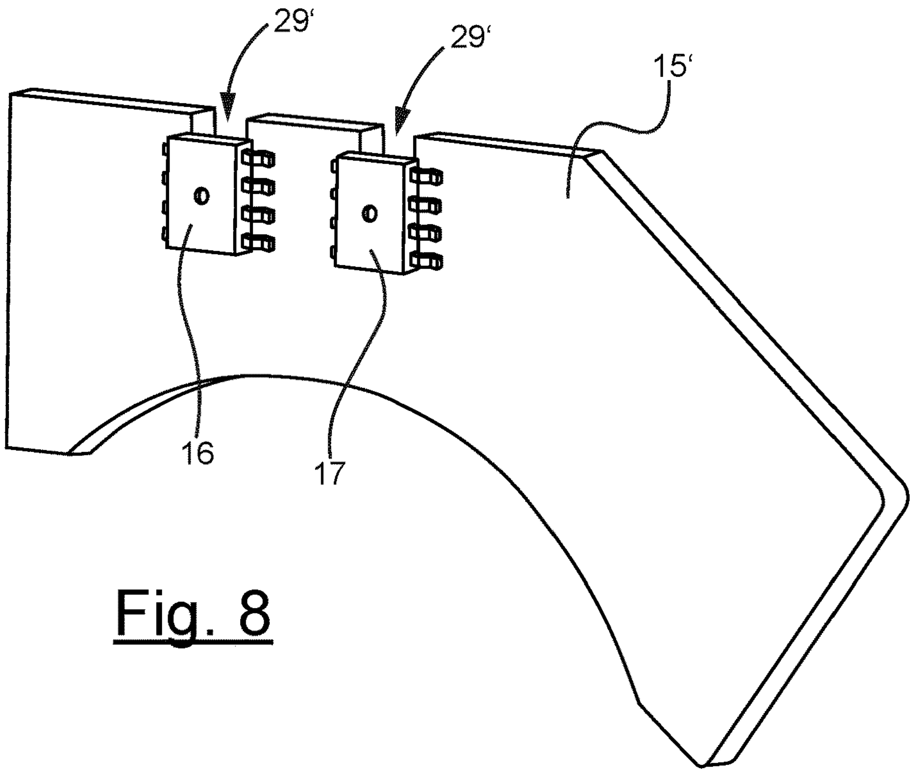
FIG. 8 shows the printed circuit board of the torque sensor device from FIGS. 6 and 7 with the two magnetic sensors fastened thereto in a perspective illustration looking at a first side of the printed circuit board.
Figure 9:
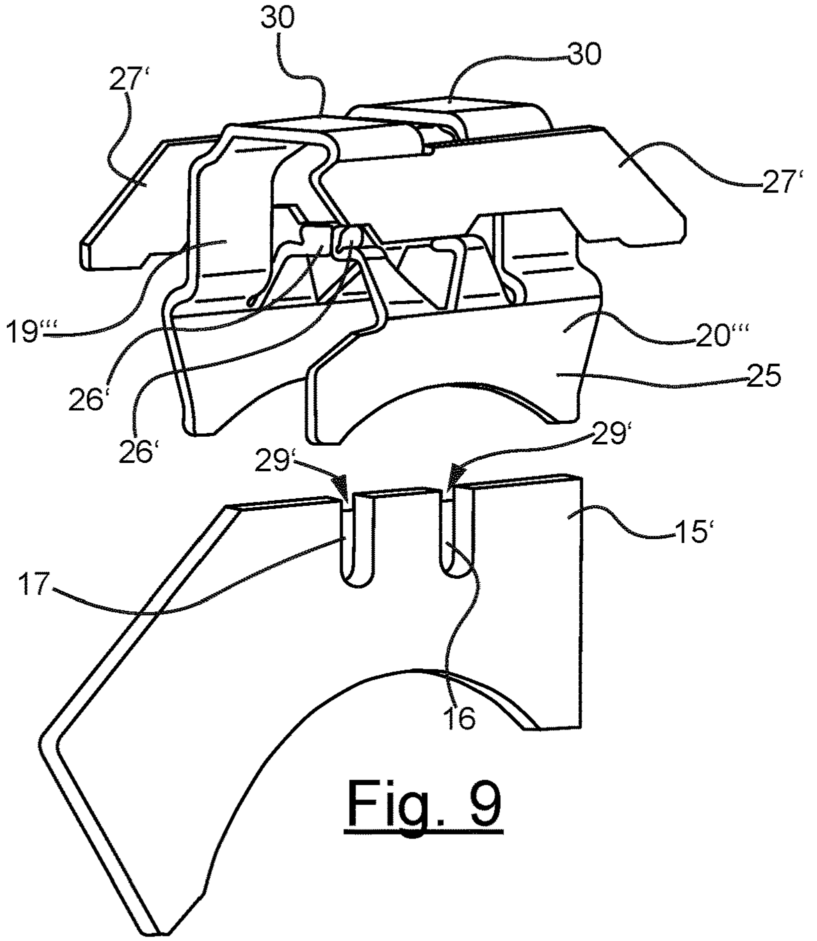
FIG. 9 shows the printed circuit board from FIG. 8 looking at the other side of the printed circuit board and the two flux guides of the torque sensor arrangement from FIG. 7, which form the flux guide arrangement of the torque sensor device from FIG. 7.

FIG. 8 shows the printed circuit board 15' of the torque sensor device from FIGS. 6 and 7 with the two magnetic sensors 16 and 17 fastened thereto in a perspective illustration looking at a first side of the printed circuit board 15', and FIG. 9 shows the printed circuit board 15' from FIG. 8 looking at the other side of the printed circuit board 15' and the two flux guides 19'" and 20'" of the torque sensor arrangement from FIG. 7, which form the flux guide arrangement of the torque sensor device 10'" from FIG. 7 and can be plugged on in the radial direction.

Of course, a large number of modifications, in particular in terms of design, are possible without departing from the scope of protection defined by the patent claims.

LIST OF REFERENCE SIGNS

- 10, 10', 10", 10'" torque sensor device according to the invention
- 11, 11', 11", 11'" second pre-assembled assembly
- 12, 12' first pre-assembled assembly
- 13 first housing part
- 14 plug receptacle
- 15, 15' printed circuit board
- 16, 17 magnetic sensor
- 18, 18' second housing part
- 19, 19', 19", 19" first flux guide
- 20, 20', 20", 20'" second flux guide
- 21 stator holder
- 22, 23 stator
- 25, 25' first collection surface
- 26, 26' transmission surface
- 27, 27' second collection surface
- 28 guide groove
- 29, 29 cutout, slot
- 30 connecting portion
- 31 fastening sleeve for fastening the stator holder
- 32 fixing ring
- 33 magnetic arrangement, in particular permanent ring magnet
- U circumferential direction
- Z center axis

The invention claimed is:

1. A torque sensor device for detecting a torque applied to a steering shaft of a motor vehicle, wherein the torque sensor device comprises:
- a magnetic arrangement,
- a stator arrangement,
- a flux guide arrangement, and
- a magnetic sensor arrangement comprising at least one magnetic sensor, wherein the magnetic arrangement is configured to generate at least one magnetic field, wherein the flux guide arrangement comprises at least one first flux guide and a second flux guide, wherein the first flux guide and the second flux guide each comprise at least one transmission surface, wherein the at least one transmission surface of the first flux guide and the at least one transmission surface of the second flux guide lie opposite one another in such a way that they form an axial gap between them in which at least one magnetic sensor of the magnetic sensor arrangement is able to be arranged, wherein the magnetic arrangement and the stator arrangement are movable relative to each other in the circumferential direction about a center axis of the torque sensor device as a result of a torque being applied, in such a way that a relative movement between the magnetic arrangement and the stator arrangement in a circumferential direction enables a magnetic flux to be generated in the stator arrangement, and wherein the torque sensor device comprises a plurality of assemblies, including at least one first pre-assembled assembly with a first housing part and a second pre-assembled assembly with a second housing part, wherein the first pre-assembled assembly comprises at least the first housing part, the stator arrangement, and at least one magnetic sensor of the magnetic sensor arrangement, wherein the second pre-assembled assembly comprises at least the second housing part, the first flux guide and the second flux guide, and wherein the second housing part is pushable or pluggable onto the first housing part or is at least partially pushable or insertable together with the first housing part, wherein, during the at least partially pushing or inserting together, at least one magnetic sensor is introducible into the gap between the transmission surfaces of the first flux guide and the second flux guide in such a way that, in a functionally assembled state of the torque sensor device, in which at least the first pre-assembled assembly and the second pre-assembled assembly are functionally assembled, a magnetic flux generated in the stator arrangement is detectable by the magnetic sensor.

2. The torque sensor device as claimed in claim 1, wherein the second pre-assembled assembly is pushable or pluggable onto the first housing part in a plane extending perpendicular to the center axis of the torque sensor device in a tangential direction or in a plane extending perpendicular to the center axis of the torque sensor device in a radial direction, or is at least partially pushable or insertable together with the first housing part.

3. The torque sensor device as claimed in claim 1, wherein the second housing part is at least partially open at least on a bottom side.

4. The torque sensor device as claimed in claim 1, wherein the first housing part and/or the second housing part have/has means for aligning the two housing parts relative to each other and/or for guiding and/or for aligning them as they are pushed on, plugged on or as they are at least partially pushed or inserted together.

5. The torque sensor device as claimed in claim 1, wherein the magnetic sensor arrangement furthermore comprises a printed circuit board, wherein at least one magnetic sensor is fastened to the printed circuit board and the printed circuit board comprises a cutout or a region of reduced thickness compared to a surrounding region, wherein the at least one magnetic sensor fastened to the printed circuit board is arranged in the region of the cutout or in the region of reduced thickness, and wherein the at least one magnetic sensor of the magnetic sensor arrangement and the cutout or the region of reduced thickness of the printed circuit board is located in the gap between the transmission surfaces of the two flux guides.

6. The torque sensor device as claimed in claim 1, wherein a magnetic working flux is able to be generated in the stator arrangement depending on the torque applied to the torque sensor device and, furthermore, a first magnetic interference flux can be generated depending on an interference magnetic field surrounding the torque sensor device, wherein the first flux guide and the second flux guide furthermore each comprise a first collection surface, wherein the collection surfaces each are configured to at least partially concentrate and/or to at least partially transmit the magnetic working flux generated in the stator arrangement depending on an applied torque and/or the first magnetic interference flux generated depending on a magnetic interference field surrounding the torque sensor device, wherein the flux guide arrangement furthermore comprises a second collection surface which is magnetically conductively coupled to at least one transmission surface and is configured to generate or to at least partially concentrate and/or transmit a second magnetic interference flux depending on a magnetic interference field surrounding the torque sensor device, wherein the flux guide arrangement is configured in such a way that, when the torque sensor device is surrounded by a magnetic interference field, a first interference-flux component which is at least partially concentrated in the first collection surface of one of the flux guides and is transmitted to the magnetic sensor via the at least one associated transmission surface of the flux guide and a second interference-flux component of the magnetic flux that is at least partially concentrated in the second collection surface and is transmitted to the magnetic sensor via an associated transmission surface of the other flux guide at least partially cancel each other out.

7. A method for at least partially assembling a torque sensor device for detecting a torque applied to a shaft about an axis of rotation of the shaft, for at, wherein the torque sensor device comprises:

a magnetic arrangement, a stator arrangement, a flux guide arrangement, and a magnetic sensor arrangement comprising at least one magnetic sensor, wherein the magnetic arrangement is configured to generate at least one magnetic field, wherein the flux guide arrangement comprises at least one first flux guide and a second flux guide and the first flux guide and wherein the second flux guide each comprise at least one transmission surface, and wherein the torque sensor device furthermore comprises a first housing part and a second housing part, the method comprising:

pre-assembling a first assembly, which comprises at least the first housing part, the stator arrangement, and at least one magnetic sensor of the magnetic sensor arrangement, pre-assembling a second assembly, which comprises at least the second housing part, the first flux guide, and the second flux guide, wherein the first flux guide and the second flux guide are connected to the second housing part in such a way that the at least one transmission surface of the first flux guide and the at least one transmission surface of the second flux guide lie opposite one another in such a way that they form an axial gap between them in which at least one magnetic sensor of the magnetic sensor arrangement is able to be arranged, assembling the first pre-assembled assembly and the second pre-assembled assembly, wherein the at least one magnetic sensor of the magnetic sensor arrangement is introduced into the gap between the transmission surfaces of the first flux guide and the second flux guide in such a way that a magnetic flux generated in the stator arrangement is detectable by means of the magnetic sensor, and fixing the two pre-assembled assemblies in their position relative to each other.

8. The method as claimed in claim 7, wherein the pre-assembling of the second assembly comprises:

first providing the second housing part, at least the first flux guide, and the second flux guide, and then inserting the first flux guide and the second flux guide into the second housing part and connecting them thereto.

9. The method as claimed in claim 7, wherein the assembling of the first and second pre-assembled assemblies together comprises:

bringing the first pre-assembled assembly and the second pre-assembled assembly into contact with each other in an engagement position, and displacing the second pre-assembled assembly in a plane extending perpendicular to the center axis of the torque sensor device in the tangential direction relative to the first assembly as far as a target position.

10. The method as claimed in claim 9, wherein the second housing part is at least partially open at least on a bottom side and on one side, and wherein, during the pre-assembly of the second assembly, at least the first flux guide or the second flux guide are/is introduced from the open bottom side or from the open side into the second housing part.

11. The method as claimed in claim 10, wherein while the first and second pre-assembled assemblies are brought into contact with each other, the second pre-assembled assembly is aligned in such a way that, in the engagement position of the second pre-assembled assembly, the open side of the second housing part extends at least substantially orthogonally to the displacement direction, and wherein, during the displacement in the tangential direction of the second pre-assembled assembly, the second pre-assembled assembly is displaced with the open side in front from the engagement position into the target position.

12. The method as claimed in claim 7, wherein the assembling of the first and second pre-assembled assemblies comprises:

bringing the first pre-assembled assembly and the second pre-assembled assembly into contact with each other in an engagement position, and displacing the second pre-assembled assembly in a plane extending perpendicular to the center axis of the torque sensor device in the radial direction relative to the first assembly as far as a target position.

13. The method as claimed in claim 12, wherein the second housing part is partially open at least on a bottom side, and wherein, during the pre-assembling of the second assembly, at least the first flux guide and/or the second flux guide, are/is introduced from the open bottom side into the second housing part.

14. The method as claimed in claim 12, wherein while the pre-assembled assemblies are brought into contact, the second pre-assembled assembly is aligned in such a way that, in the engagement position of the second pre-assembled assembly, the open bottom side extends at least substantially orthogonally to the displacement direction, and wherein, during the displacement of the second pre-assembled assembly in the radial direction, the second pre-assembled assembly is displaced with the open bottom side in front from the engagement position into the target position.

15. The method as claimed in claim 7, wherein the magnetic sensor arrangement furthermore comprises a printed circuit board and at least one magnetic sensor is fastened to the printed circuit board, wherein the printed circuit board comprises a cutout or a region of reduced thickness compared to a surrounding region, wherein the at least one magnetic sensor fastened to the printed circuit board is arranged in the region of the cutout or in the region of reduced thickness, and wherein the assembling of the first pre-assembled assembly and of the second pre-assembled assembly is carried out in such a way that, after the at least one magnetic sensor of the magnetic sensor arrangement is introduced into the gap between the transmission surfaces of the first flux guide and the second flux guide, the cutout or the region of reduced thickness of the printed circuit board is likewise located in the gap between the transmission surfaces of the two flux guides.

* * * * *